US012563517B2

(12) United States Patent
Wang et al.

(10) Patent No.: US 12,563,517 B2
(45) Date of Patent: Feb. 24, 2026

(54) METHOD FOR PROCESSING NETWORK REGISTRATION ANOMALY, APPARATUS, STORAGE MEDIUM, AND CHIP

(71) Applicant: Honor Device Co., Ltd., Shenzhen (CN)

(72) Inventors: Zhulin Wang, Shenzhen (CN); Feifei Sui, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 782 days.

(21) Appl. No.: 17/760,478

(22) PCT Filed: Sep. 7, 2021

(86) PCT No.: PCT/CN2021/116901
§ 371 (c)(1),
(2) Date: Aug. 10, 2022

(87) PCT Pub. No.: WO2022/083329
PCT Pub. Date: Apr. 28, 2022

(65) Prior Publication Data
US 2023/0337166 A1 Oct. 19, 2023

(30) Foreign Application Priority Data
Oct. 22, 2020 (CN) .......................... 202011140963.3

(51) Int. Cl.
*H04W 8/06* (2009.01)
*H04W 24/04* (2009.01)
(Continued)

(52) U.S. Cl.
CPC ........... *H04W 60/00* (2013.01); *H04W 24/04* (2013.01)

(58) Field of Classification Search
CPC ....... H04W 60/00; H04W 24/04; H04W 8/06; H04W 48/18; H04W 76/18; H04W 76/19; H04W 60/04; H04W 88/06
See application file for complete search history.

(56) References Cited

U.S. PATENT DOCUMENTS

| | | | |
|---|---|---|---|
| 7,594,152 B2 | 9/2009 | Lee et al. | |
| 9,973,978 B2 * | 5/2018 | Mahmood ....... | H04W 36/00224 |

(Continued)

FOREIGN PATENT DOCUMENTS

| | | |
|---|---|---|
| CN | 101931923 A | 12/2010 |
| CN | 102362533 A | 2/2012 |

(Continued)

OTHER PUBLICATIONS

Nokia, et al., "Discussion on LS on Transmission mechanism of SUCI in NAS procedure", 3GPP TSG SA WG3 (Security) Meeting #92 ad-hoc, S3-182842, Sep. 24-28, 2108, 2 Pages, Harbin (China).

*Primary Examiner* — Joseph E Dean, Jr.
(74) *Attorney, Agent, or Firm* — Slater Matsil, LLP

(57) ABSTRACT

This application provides a method for processing a network registration anomaly, an apparatus, and a storage medium. In a 5G SA network registration process, if an anomaly occurs in a registration, a terminal device obtains registration failure cause information and a cumulative failure count, to determine whether a condition for ending the registration early is met. If the condition is met, the 5G SA network registration process is ended early, and there is no need to re-attempt for five times according to a protocol, thereby quickly falling back to an LTE network to resume services.

20 Claims, 11 Drawing Sheets

300

A terminal device initiates an $M^{th}$ registration request to a 5G SA network, where M is a positive integer less than 5 — S310

In a case that the $M^{th}$ registration fails, the terminal device obtains cause information of the $M^{th}$ registration failure and a cumulative failure count M — S320

The cause information of the $M^{th}$ registration failure conforms to first preset cause information, and the cumulative failure count M is greater than or equal to a first preset count — 330 — No / Yes The terminal device executes a first processing policy corresponding to the first preset cause information, where the first processing policy includes: stopping initiating the registration request to the 5G SA network, and initiating the registration request to a second network different from the 5G SA network — S340

The terminal device initiates an $(M+1)^{th}$ registration request to the 5G SA network after a first waiting duration — S350

(51) Int. Cl.

| | | |
|---|---|---|
| *H04W 48/18* | (2009.01) | |
| *H04W 60/00* | (2009.01) | |
| *H04W 60/04* | (2009.01) | |
| *H04W 76/18* | (2018.01) | |
| *H04W 76/19* | (2018.01) | |
| *H04W 88/06* | (2009.01) | |

(56)              References Cited

U.S. PATENT DOCUMENTS

| | | | | |
|---|---|---|---|---|
| 10,136,365 | B2 | 11/2018 | Xu et al. | |
| 11,172,458 | B2 | 11/2021 | Tiwari et al. | |
| 2017/0006038 | A1 | 1/2017 | Zhang et al. | |
| 2018/0176876 | A1* | 6/2018 | Alam | H04W 60/00 |
| 2020/0221495 | A1 | 7/2020 | Chen et al. | |
| 2023/0086087 | A1 | 3/2023 | Shen et al. | |

FOREIGN PATENT DOCUMENTS

| | | | | |
|---|---|---|---|---|
| CN | 105376773 | A | 3/2016 | |
| CN | 105376783 | A | 3/2016 | |
| CN | 106487883 | A | 3/2017 | |
| CN | 107241709 | A | 10/2017 | |
| CN | 105376773 | B | 9/2018 | |
| CN | 109379779 | A | 2/2019 | |
| CN | 111083692 | A | 4/2020 | |
| CN | 111372327 | A | 7/2020 | |
| CN | 111436071 | A | 7/2020 | |
| KR | 20140020181 | A * | 2/2014 | H04W 24/04 |
| RU | 2372732 | C2 | 11/2009 | |
| RU | 2663710 | C2 | 8/2018 | |
| RU | 2667379 | C2 | 9/2018 | |
| WO | 2019187483 | A1 | 10/2019 | |

* cited by examiner (a)

(b)

<u>300</u>

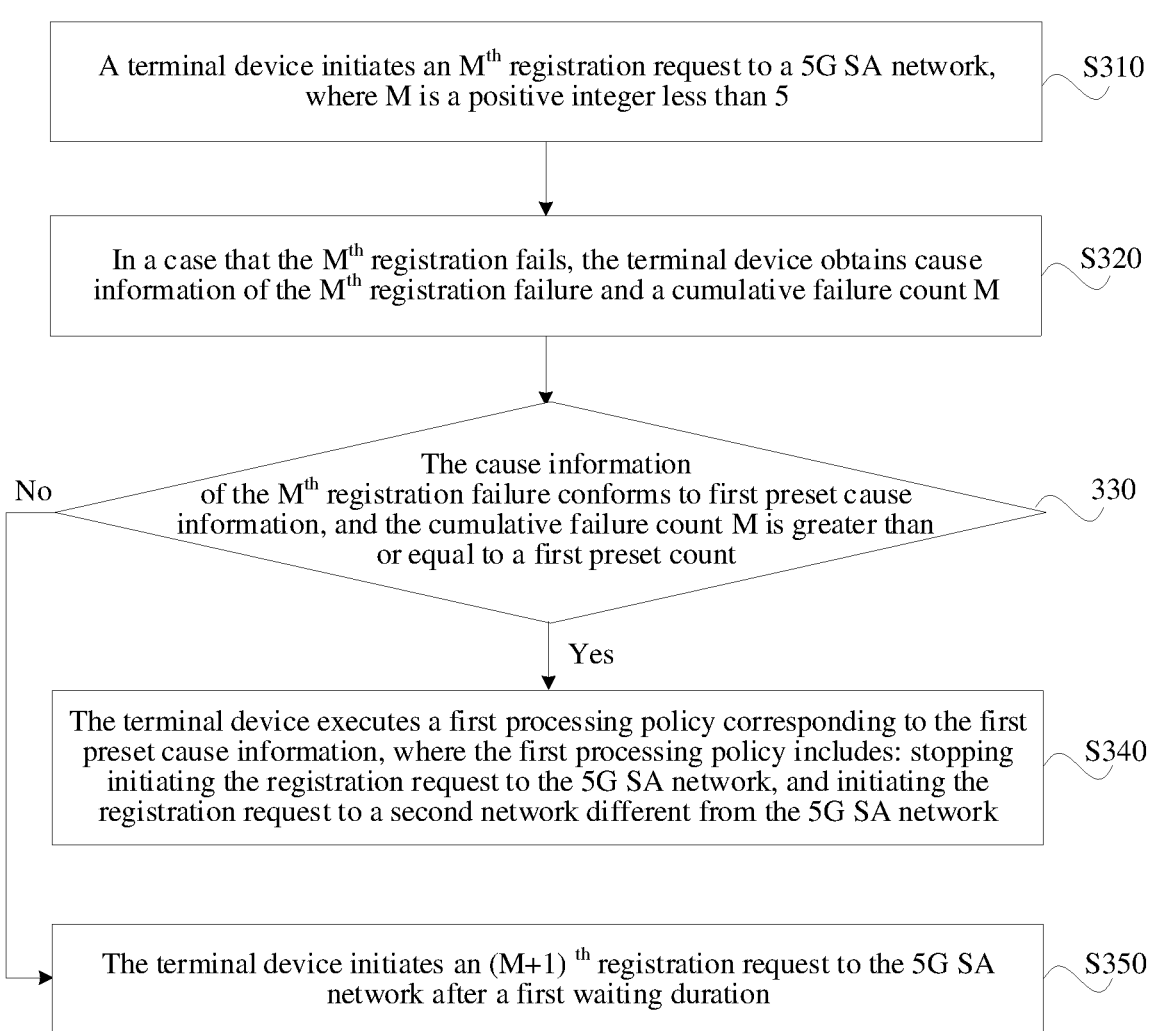

A terminal device initiates an M$^{th}$ registration request to a 5G SA network, where M is a positive integer less than 5          S310

In a case that the M$^{th}$ registration fails, the terminal device obtains cause information of the M$^{th}$ registration failure and a cumulative failure count M          S320

The cause information of the M$^{th}$ registration failure conforms to first preset cause information, and the cumulative failure count M is greater than or equal to a first preset count          330

No

Yes

The terminal device executes a first processing policy corresponding to the first preset cause information, where the first processing policy includes: stopping initiating the registration request to the 5G SA network, and initiating the registration request to a second network different from the 5G SA network          S340

The terminal device initiates an (M+1)$^{th}$ registration request to the 5G SA network after a first waiting duration          S350

FIG. 4

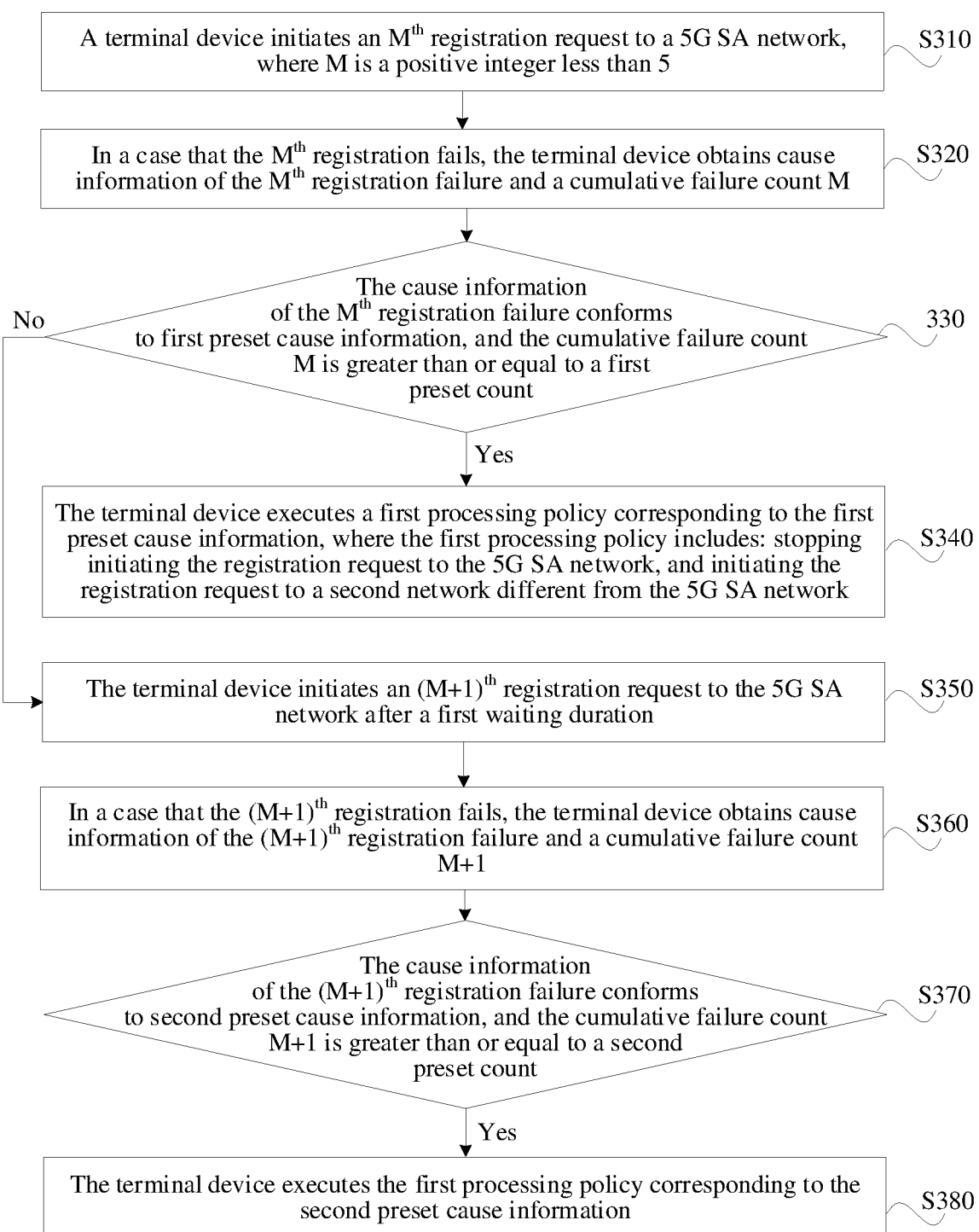

300

A terminal device initiates an $M^{th}$ registration request to a 5G SA network, where M is a positive integer less than 5 — S310

In a case that the $M^{th}$ registration fails, the terminal device obtains cause information of the $M^{th}$ registration failure and a cumulative failure count M — S320

The cause information of the $M^{th}$ registration failure conforms to first preset cause information, and the cumulative failure count M is greater than or equal to a first preset count — 330

No

Yes

The terminal device executes a first processing policy corresponding to the first preset cause information, where the first processing policy includes: stopping initiating the registration request to the 5G SA network, and initiating the registration request to a second network different from the 5G SA network — S340

The terminal device initiates an $(M+1)^{th}$ registration request to the 5G SA network after a first waiting duration — S350

In a case that the $(M+1)^{th}$ registration fails, the terminal device obtains cause information of the $(M+1)^{th}$ registration failure and a cumulative failure count M+1 — S360

The cause information of the $(M+1)^{th}$ registration failure conforms to second preset cause information, and the cumulative failure count M+1 is greater than or equal to a second preset count — S370

Yes

The terminal device executes the first processing policy corresponding to the second preset cause information — S380

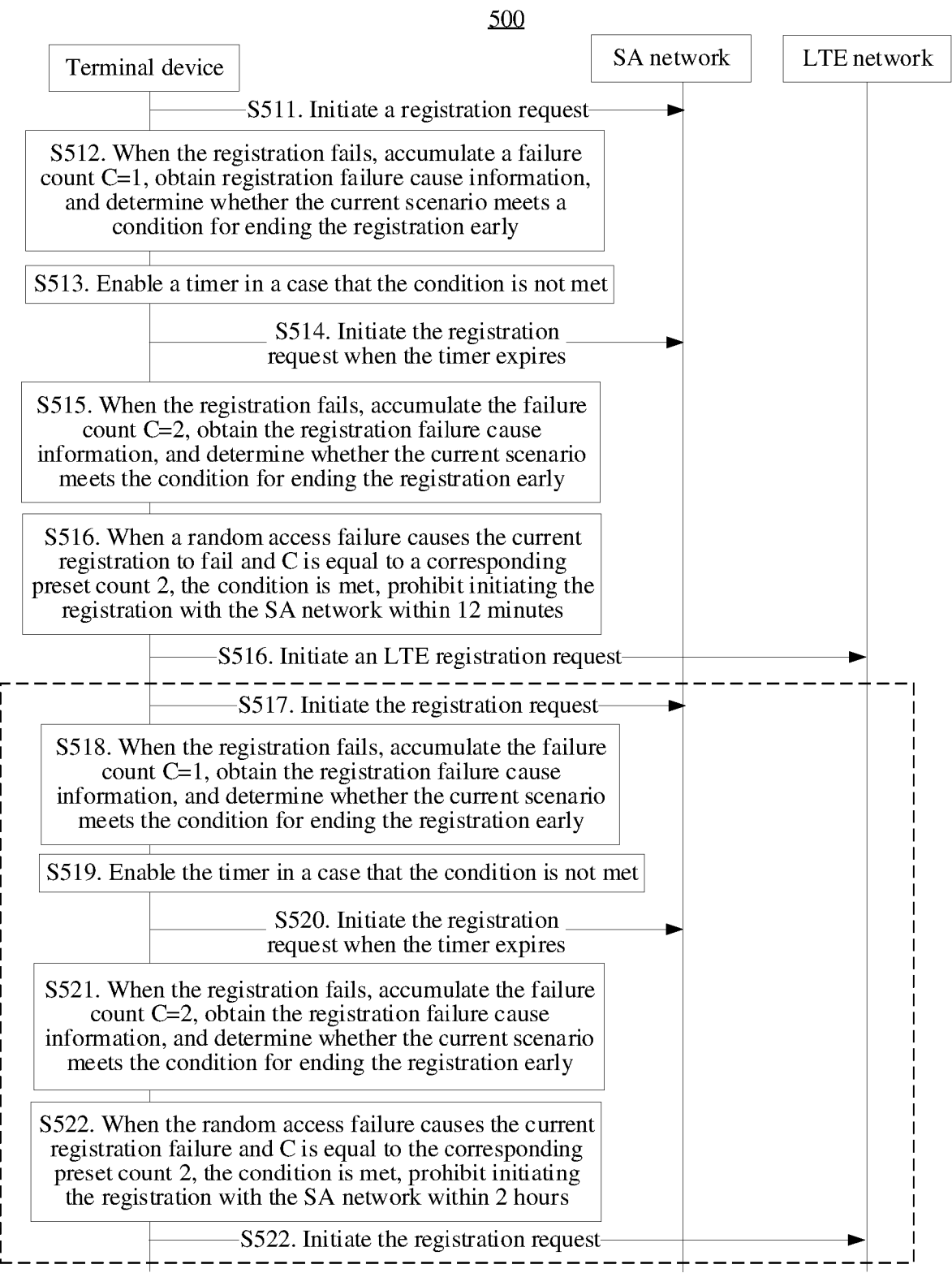

Terminal device                                SA network            LTE network S511. Initiate a registration request S512. When the registration fails, accumulate a failure count C=1, obtain registration failure cause information, and determine whether the current scenario meets a condition for ending the registration early S513. Enable a timer in a case that the condition is not met S514. Initiate the registration request when the timer expires S515. When the registration fails, accumulate the failure count C=2, obtain the registration failure cause information, and determine whether the current scenario meets the condition for ending the registration early S516. When a random access failure causes the current registration to fail and C is equal to a corresponding preset count 2, the condition is met, prohibit initiating the registration with the SA network within 12 minutes S516. Initiate an LTE registration request S517. Initiate the registration request S518. When the registration fails, accumulate the failure count C=1, obtain the registration failure cause information, and determine whether the current scenario meets the condition for ending the registration early S519. Enable the timer in a case that the condition is not met S520. Initiate the registration request when the timer expires S521. When the registration fails, accumulate the failure count C=2, obtain the registration failure cause information, and determine whether the current scenario meets the condition for ending the registration early S522. When the random access failure causes the current registration failure and C is equal to the corresponding preset count 2, the condition is met, prohibit initiating the registration with the SA network within 2 hours S522. Initiate the registration request

METHOD FOR PROCESSING NETWORK REGISTRATION ANOMALY, APPARATUS, STORAGE MEDIUM, AND CHIP

CROSS-REFERENCE TO RELATED APPLICATIONS

This application is a national stage application of International Application No. PCT/CN2021/116901, filed on Sep. 7, 2021, which claims priority of Chinese Patent Application No. 202011140963.3 filed on Oct. 22, 2020. Both of these applications are hereby incorporated by reference in their entireties.

TECHNICAL FIELD

This application relates to the field of communications technologies, and in particular, to a method for processing a network registration anomaly, a storage medium, and a chip.

BACKGROUND

Currently, if a terminal device registers with a network, the terminal device fails to register with the network because an anomaly occurs in interaction between the terminal device and the network. In a case that the terminal device fails to register with the network, the terminal device usually waits for a preset duration and then re-initiates a registration request to the network. If the terminal device still fails to re-register with the network, the terminal device waits for the preset duration and then re-attempts. In this way, the terminal device will attempt for a plurality of times (for example, a maximum registration attempt count is 5). After the failure count of the terminal device reaches the maximum registration attempt count, the terminal device will no longer initiate the registration request to the network within a period of time and initiate the registration request to other networks to resume services. It can be seen that, in a case that an anomaly always exists if the terminal device registers with a network, because a plurality of times of attempts are required, the registration process is time-consuming, and the services cannot be quickly resumed, which affects user service experience.

SUMMARY

Embodiments of this application provide a method for processing a network registration anomaly, an apparatus, a storage medium, and a chip, which can solve a problem of frequent registration failures due to network anomalies or poor environmental signals in a network registration process.

According to a first aspect, a method for processing a network registration anomaly is provided, including: initiating, by a terminal device, an $M^{th}$ registration request to a fifth generation (5th generation, 5G) standalone (standalone, SA) network, where M is a positive integer less than N, and N is a preset integer; in a case that the $M^{th}$ registration fails, obtaining, by the terminal device, cause information of the $M^{th}$ registration failure and a cumulative failure count M; and if the cause information of the $M^{th}$ registration failure conforms to first preset cause information, and the cumulative failure count M is greater than or equal to a first preset count corresponding to the first preset cause information, executing, by the terminal device, a first processing policy corresponding to the first preset cause information, where the first processing policy includes: stopping initiating the registration request to the 5G SA network, and initiating the registration request to a second network different from the 5G SA network. The first preset cause information is used to indicate any one of the following: a registration failure due to a link establishment failure, a registration failure due to a link released after being established, a registration failure due to no response from the 5G SA network, and a registration failure due to registration reject from the 5G SA network.

According to the above solution, if an anomaly occurs in a network registration, the terminal device may obtain registration failure cause information and a cumulative failure count, to determine whether a condition for ending the registration early is met. If the condition is met, a registration process is ended early, there is no need to re-attempt for a plurality of times according to a protocol, and another network can be registered with to quickly resume services at this time. Therefore, according to the solution of this application, an abnormal registration can be ended early and another network is registered with if an anomaly occurs in a network registration, to reduce time affected by registration anomaly, thereby solving a problem of frequent registration failures due to a network anomaly or a poor environmental signal in the network registration process and improving user service experience.

In some possible implementations, the second network is a long term evolution (LTE) network, and in a case that a mobile phone fails to register with the 5G SA network for consecutive times, if it is determined that a current registration anomaly scenario meets a condition for ending the registration early according to the registration failure cause information and the cumulative failure count, the mobile phone stops initiating the registration request to the 5G SA network, and may initiate the registration request to the LTE network at this time. Therefore, according to the method for processing a network registration anomaly provided in this application, the mobile phone can quickly escape if an anomaly occurs in the 5G SA network registration process, and fall back to the LTE network for registration, thereby reducing time affected by registration anomaly and improving user service experience.

M may be 1, 2, 3, or 4. If M is 1, the terminal device initiates the first (that is, initial) registration request to the 5G SA network. If M is greater than 1 and less than 5, before the terminal device initiates the $M^{th}$ registration request to the 5G SA network, the terminal device fails to register with the 5G SA network for M–1 consecutive times. For example, if M is 2, the terminal device initiates the second registration request to the 5G SA network after the first registration with the 5G SA network fails.

In some possible implementations, if M is greater than 1 and less than N, before the terminal device initiates the $M^{th}$ registration request to the 5G SA network, the terminal device fails to register with the 5G SA network for M–1 consecutive times.

In some possible implementations, the method further includes: counting, by the terminal device, once each time the terminal device fails to register with the 5G SA network, and accumulating the cumulative failure count M in a case that the $M^{th}$ registration fails.

In some possible implementations, after the obtaining, by the terminal device, cause information of the $M^{th}$ registration failure and a cumulative failure count M, the method further includes: initiating, by the terminal device, an (M+1)$^{th}$ registration request to the 5G SA network after a first waiting duration, if the cause information of the $M^{th}$ registration failure does not conform to the first preset cause information, or if the cause information of the $M^{th}$ registration failure conforms to the first preset cause information and the cumulative failure count M is less than the first preset count.

In some possible implementations, after the initiating, by the terminal device, an $(M+1)^{th}$ registration request to the 5G SA network after a first waiting duration, the method further includes:

in a case that the terminal device fails to register with the 5G SA network for the $(M+1)^{th}$ time, obtaining, by the terminal device, cause information of the $(M+1)^{th}$ registration failure and a cumulative failure count M+1; and if the cause information of the $(M+1)^{th}$ registration failure conforms to second preset cause information, and the cumulative failure count M+1 is greater than or equal to a second preset count corresponding to the second preset cause information, executing, by the terminal device, the first processing policy corresponding to the second preset cause information.

In some possible implementations, the stopping, by the terminal device, initiating the registration request to the 5G SA network includes: prohibiting, by the terminal device, initiating the registration request to the 5G SA network within a first preset penalty duration corresponding to the first preset cause information. The first preset penalty duration is greater than the first waiting duration.

In some possible implementations, after the prohibiting, by the terminal device, initiating the registration request to the 5G SA network within a first preset penalty duration, the method further includes: initiating, by the terminal device, the registration request to the 5G SA network after the first preset penalty duration.

In some possible implementations, before the initiating, by the terminal device, the registration request to the 5G SA network after the first preset penalty duration, the method further includes: receiving, by the terminal device, instruction information sent by the 5G SA network or the second network, where the instruction information is used to instruct to initiate the registration request to the 5G SA network.

In this case, the initiating, by the terminal device, the registration request to the 5G SA network includes: initiating, by the terminal device, the registration request to the 5G SA network according to the instruction information.

In some possible implementations, after the initiating, by the terminal device, the registration request to the 5G SA network, the method further includes: prohibiting, by the terminal device, initiating the registration request to the 5G SA network within a second preset penalty duration in a case that the terminal device fails to register with the 5G SA network for M consecutive times and registration failure cause information of the $M^{th}$ registration failure conforms to the first preset cause information.

The second preset penalty duration is greater than the first preset penalty duration.

In some possible implementations, the method further includes: pre-storing, by the terminal device, at least one correspondence, where the at least one correspondence includes a first correspondence and a second correspondence, the first correspondence is a correspondence among the first preset cause information, the first preset count, and the first processing policy, and the second correspondence is a correspondence among the second preset cause information, the second preset count, and the first processing policy.

If the cause information of the $M^{th}$ registration failure conforms to the first preset cause information, the method further includes: determining, by the terminal device, the first preset count corresponding to the first preset cause information according to the first correspondence.

In some possible implementations, the initiating, by the terminal device, the registration request to a second network different from the 5G SA network includes: searching for, by the terminal device, at least one available network other than the 5G SA network, where the at least one available network includes the second network, and reference signal received quality of the second network in the at least one available network is optimal; and initiating, by the terminal device, the registration request to the second network.

According to a second aspect, this application provides an apparatus for processing a registration anomaly. The apparatus is configured to perform the method according to the first aspect or any possible implementation of the first aspect. Specifically, the apparatus may include modules configured to perform the method according to the first aspect or any possible implementation of the first aspect.

According to a third aspect, this application provides an apparatus for processing a registration anomaly. The apparatus includes: a processor, the processor is coupled to a memory, the memory is configured to store a computer program or instruction, and the processor is configured to execute the computer program or instruction stored in the memory, so that the method according to the first aspect is performed.

For example, the processor is configured to execute the computer program or instruction stored in the memory to cause the apparatus to perform the method according to the first aspect.

Optionally, the apparatus includes one or more processors.

Optionally, the apparatus may also include a memory coupled to the processor.

Optionally, the apparatus may include one or more memories.

Optionally, the memory may be integrated with the processor or be separately arranged.

Optionally, the apparatus may further include a transceiver.

According to a fourth aspect, a computer-readable storage medium is provided. The computer-readable storage medium stores a computer program (which may also be referred to as an instruction or a code) for implementing the method according to the first aspect.

For example, the computer program, if executed by a computer, causes the computer to perform the method according to the first aspect. The computer may be a communication apparatus.

According to a fifth aspect, this application provides a chip, including a processor. The processor is configured to read and execute a computer program stored in a memory, to perform the method according to the first aspect and any possible implementation of the first aspect.

Optionally, the chip further includes the memory, and the processor is connected to the memory through a circuit or a wire.

Further, optionally, the chip further includes a communication interface.

According to a sixth aspect, this application provides a computer program product. The computer program product includes a computer program (also referred to as an instruction or a code), and the computer program, if executed by a computer, causes the computer to implement the method according to the first aspect. The computer may be a communication apparatus.

BRIEF DESCRIPTION OF THE DRAWINGS

FIG. 4 is a schematic flowchart of a method for processing a network registration anomaly according to an embodiment of this application.

FIG. 7 is a schematic flowchart of another method for processing a network registration anomaly according to an embodiment of this application.

FIG. 9 is a schematic flowchart of a method for processing a network registration anomaly according to an embodiment of this application that is applied to a scenario in which a random access failure causes a registration failure.

DETAILED DESCRIPTION OF ILLUSTRATIVE EMBODIMENTS

Figure 1:
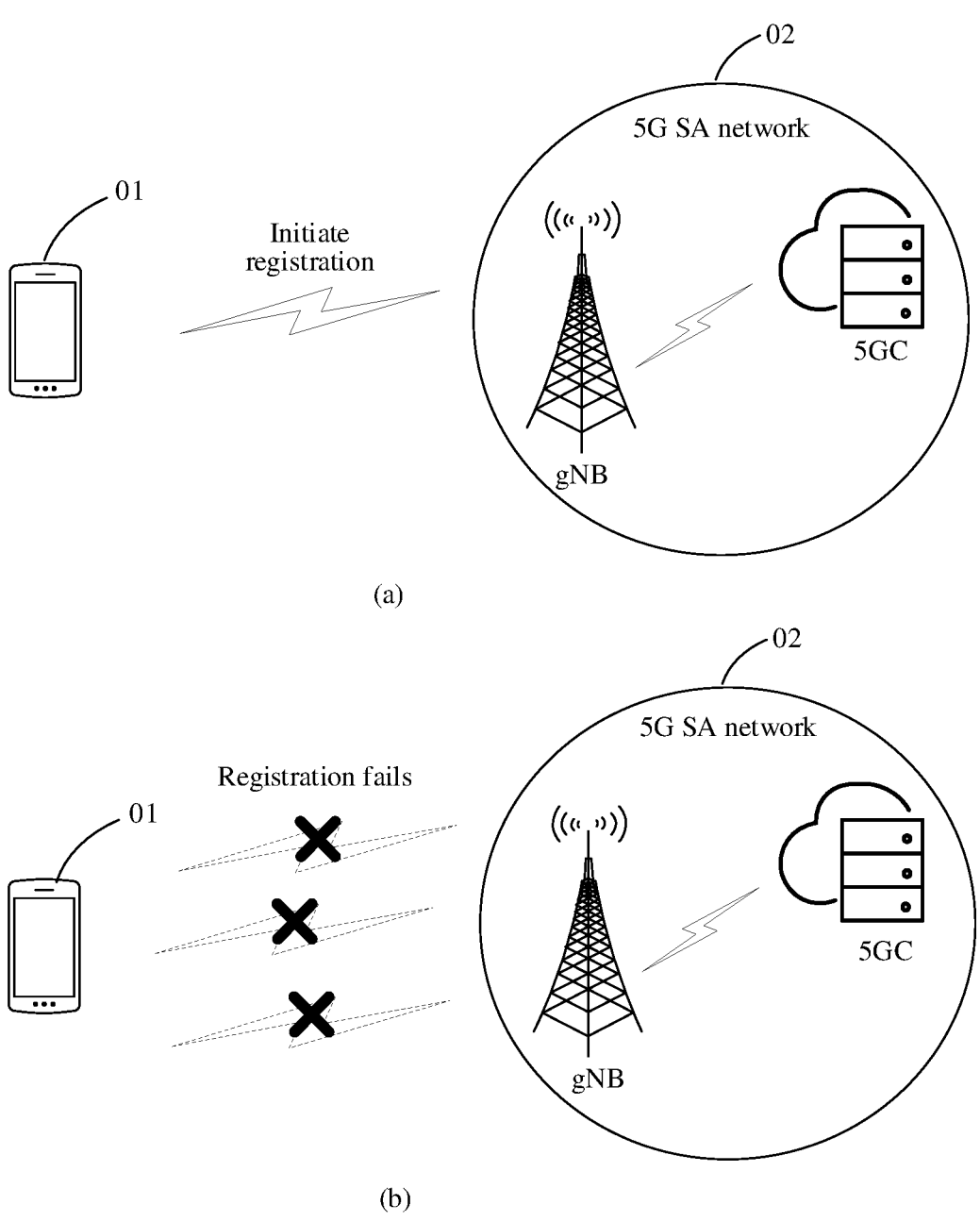
FIG. 1 is a schematic architectural diagram of a communication system according to an embodiment of this application.

In order to make objectives, technical solutions, and advantages of embodiments of the present application clearer, the technical solutions in the embodiments of the present application will be clearly and completely described in the following with reference to the accompanying drawings. It is obvious that the embodiments to be described are only a part rather than all of the embodiments of the present application. Based on the embodiments in the application, all other embodiments obtained by a person skilled in the art without paying any creative efforts all fall within the protection scope of the application.

The technical solutions of the embodiments of this application may be applied to various communication systems, such as a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD), a universal mobile telecommunication system (universal mobile telecommunication system, UMTS), a worldwide interoperability for microwave access (worldwide interoperability for microwave access, WiMAX) communication system, a future 5G system, or a new radio (new radio, NR) system.

A terminal device includes a device that provides voice and/or data connectivity for a user, and specifically, includes a device that provides voice for the user, or a device that provides data connectivity for the user, or a device that provides both voice and data connectivity for the user. The terminal device may include, for example, a handheld device having a wireless connection function or a processing device connected to a wireless modem. The terminal device may communicate with a core network device by using a radio access network (radio access network, RAN) device and exchange voice and/or data with the RAN. The terminal device may include user equipment (user equipment, UE), a wireless terminal device, a mobile terminal device, a device-to-device (device-to-device, D2D) terminal device, a vehicle to everything (vehicle to everything, V2X) terminal device, a machine-to-machine/machine-type communications (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), or a user device (user device), or the like. For example, the terminal device may include a mobile phone (or referred to as a "cellular" phone), a computer having a mobile terminal device, or a portable, pocket-sized, handheld, or computer-built-in mobile apparatus. For example, the terminal device may be a device such as a personal communication service (personal communication service, PCS) phone, a cordless telephone set, a Session Initiation Protocol (Session Initiation Protocol, SIP) phone, a wireless local loop (wireless local loop, WLL) station, or a personal digital assistant (personal digital assistant, PDA). The terminal device further includes a limited device, such as a device having lower power consumption, or a device having limited storage capacity, or a device having limited computing power. For example, the terminal device includes an information sensing device such as a barcode identification device, a radio frequency identification (radio frequency identification, RFID) device, a sensor, a Global Positioning System (Global Positioning System, GPS), or a laser scanner.

In the embodiments of this application, the terminal device may further include a relay (relay). Alternatively, it may be understood that any device capable of performing data communication with a base station may be regarded as the terminal device.

In the embodiments of this application, an apparatus configured to implement a function of the terminal device may be the terminal device or may be an apparatus capable of supporting the terminal device to implement the function, such as a chip system, and the apparatus may be installed in the terminal device. In the embodiments of this application, the chip system may include a chip, or may include a chip and another discrete device. In the technical solutions provided in the embodiments of this application, the technical solutions provided in the embodiments of this application are described by using an example in which the apparatus configured to implement a function of the terminal is the terminal device.

A network device in the embodiments of this application may be a device capable of providing a random access function for the terminal device or a chip capable of being arranged in the device. The device includes but is not limited to: an evolved Node B (evolved Node B, eNB), a radio network controller (radio network controller, RNC), a Node B (Node B, NB), a base station controller (base station controller, BSC), a base transceiver station (base transceiver station, BTS), a home base station (home evolved NodeB, or home Node B, HNB), a baseband unit (baseband unit, BBU), an access point (access point, AP) in a wireless fidelity (wireless fidelity, WIFI) system, a wireless relay node, a wireless backhaul node, a transmission point (transmission point, TP) or a transmission and reception point (transmission and reception point, TRP), or the like, or may be the fifth generation (the fifth generation, 5G) system, for example, a 5G base station (gNB) or transmission point (TRP or TP) in a new radio (new radio, NR), one or a group of antenna panel (including a plurality of antenna panels) of a base station in a 5G system, or may be a network node that constitutes a gNB or a transmission point, such as a baseband unit (BBU), a distributed unit (distributed unit, DU). The 5G base station may include a macro base station, a micro base station, a relay station, an access point, or the like in various forms. In systems using different radio access technologies, names of devices having a function of a base station may be different.

In some deployments, the gNB may include a centralized unit (centralized unit, CU) and a distributed unit (distributed unit, DU). The gNB may further include an active antenna unit (active antenna unit, AAU). The CU implements some functions of the gNB, and the DU implements some functions of the gNB. For example, the CU is responsible for processing a non-real-time protocol and service, and implementing a function at radio resource control (radio resource control, RRC) and packet data convergence protocol (packet data convergence protocol, PDCP) layers. The DU is responsible for processing a physical layer protocol and real-time service, and implementing a function at radio link control (radio link control, RLC), media access control (media access control, MAC), and physical (physical, PHY) layers. The AAU implements some physical layer processing functions, and functions related to radio frequency processing and active antenna. Because information of the RRC layer eventually becomes information of the PHY layer or be transformed from the information of the PHY layer, under this architecture, higher layer signaling, such as RRC layer signaling, may also be considered to be sent by the DU, or, sent by DU+AAU. It may be understood that the network device may be a device including one or more of a CU node, a DU node, and an AAU node. In addition, the CU may be divided into a network device in the RAN, or the CU may be divided into a network device in a core network (core network, CN). This is not limited in this application.

For ease of understanding the embodiments of this application, some terms in the embodiments of this application are described below, so as to help a person skilled in the art have a better understanding.

1) SA networking: Standalone networking, which refers to a newly built 5G network, including a new base station, a backhaul link, and a core network. While introducing a new network element and interface, the SA network also adopts new technologies such as network virtualization and a software-defined network on a large scale, and combine with 5G NR. In addition, technical challenges faced by protocol development, network planning and deployment, and interoperability of the SA network will surpass those of 3G and 4G systems.

Compared with the SA networking, there is also a non-standalone networking, namely 5G NSA (non-standalone), which refers to deployment of a 5G network using the existing 4G infrastructure. A 5G carrier based on an NSA architecture only carries user data, and control signaling of the 5G carrier is still transmitted through a 4G network.

2) Network Registration

To obtain a service provided by a network, the terminal device first needs to register with the network, that is, register to access the network. Generally, the network registration may be divided into the following two types:

(a) Initial registration: The initial registration is triggered if the terminal device is powered on. For example, assuming that the terminal device is currently in the 5G SA network, if the terminal device is powered on, the terminal device initiates registration with the 5G SA network to implement the initial registration.

(b) Mobile update registration (also referred to as mobile registration): If the terminal device leaves a current registration area and enters a new tracking area (tracking area, TA), the mobile update registration is triggered. For example, if the terminal device moves from a currently registered LTE network to the 5G SA network, the terminal device initiates registration with the 5G SA network to implement mobile update registration.

It should be noted that, the above exemplarily enumerates two types of network registrations. The embodiments of this application do not limit the type of the network registration. It may be understood that, in actual implementation, the network registration may further include any other possible network registration, such as a periodic registration. The periodic registration may be triggered by a periodic timer T3512 delivered by a network side, that is, if a periodic registration timer expires, the periodic registration is triggered. This type of registration is similar to a heartbeat mechanism, which aims to let a network know that the terminal device is still powered on in a service area.

(a) in FIG. 1 is a schematic architectural diagram of a communication system according to an embodiment of this application. The communication system in FIG. 1 may include a terminal device 01 and an SA network 02. Exemplarily, the SA network 02 may include an access network device (for example, a gNB) and a core network device (for example, a 5G core network device, denoted as 5GC). Correspondingly, the SA network may be referred to as a 5G SA network. A wireless connection may be established between the terminal device 01 and the 5G SA network 02, and the SA network may provide a communication service for the terminal device 01. The terminal device 01 needs to initiate a registration request to the 5G SA network 02 first, and can only obtain authorization to accept a service provided by the 5G SA network 02 after the registration is successful. It should be noted that, FIG. 1 provides illustrative description by using a terminal device, an access network device, and a core network device as an example. It may be understood that the embodiments of this application may be applied to a communication system including one or more access network devices, or be applied to a communication system including one or more terminal devices. This is not limited in this application.

Figure 2:
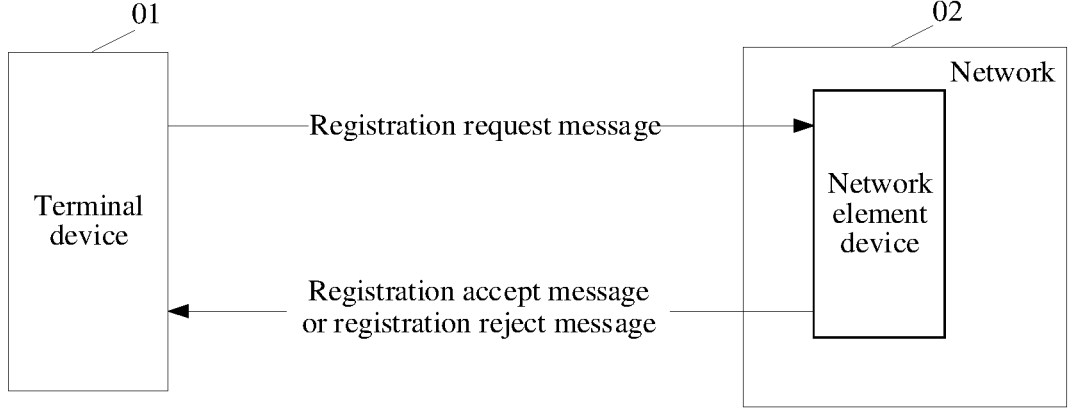
FIG. 2 is a schematic diagram of an interaction between a terminal device and a network in a communication system according to an embodiment of this application.

It should be noted that, as shown in FIG. 2, the terminal device 01 initiates a registration request to the 5G SA network 02. Specifically, the terminal device sends a registration request message to a network element device (for example, a RAN device, such as a gNB) in the 5G SA network 02. After receiving the registration request message, the network element device may send a registration accept (REGISTRATION ACCEPT) message or a registration reject (REGISTRATION REJECT) message to the terminal device 01. For a detailed description of signaling interactions between the network element devices after the network receives the registration request message, reference may be made to a detailed description of the network registration in the related art, which is not repeated herein.

During a network registration process of the terminal device, the registration may succeed or fail.

Exemplarily, after the terminal device sends the registration request message to the SA network, if the terminal device receives the registration accept message returned by the SA network, the terminal device successfully registers with the SA network. This is a scenario of a normal network registration.

Still exemplarily, for example, if the terminal device receives the registration reject message returned by the SA network, or, the terminal device does not receive a registration response message (whether it is the registration accept message or the registration reject message) within a preset duration after sending the registration request message to the SA network (a timer T3510 is used in a protocol, which is 15 seconds), or an anomaly occurs in a lower layer link, the registration of the terminal device fails. This is a scenario of a network registration anomaly.

Referring to (a) in FIG. 1, the terminal device 01 initiates registration (initial registration or mobile update registration) with the SA network 02. Referring to (b) in FIG. 1, the terminal device 01 fails to initiate the registration to the SA network 02, that is, a network registration anomaly occurs. For this network registration anomaly, the related art provides an anomaly processing policy: if the network registration fails, the terminal device accumulates a registration attempt count (registration attempt counter). If the registration attempt count is less than 5, the terminal device enables a timer T3511 (10 seconds), and after the timer T3511 expires, the terminal device re-initiates the registration with the SA network (also referred to as initiating SA registration). If the registration attempt count is equal to 5, the terminal device enables a timer T3502 (12 minutes by default), and does not initiate the registration request to the SA network within this period of time. It should be noted that, for details of this anomaly processing policy, reference may be made to the descriptions in Sections 5.5.1.2.7 and 5.5.1.3.7 of Protocol 24.501, in which a processing manner on a terminal device side in a case that the core network does not respond to the registration request or an anomaly occurs in the lower layer link during an initial registration and a mobile registration process of the SA network is described in detail.

Figure 3:
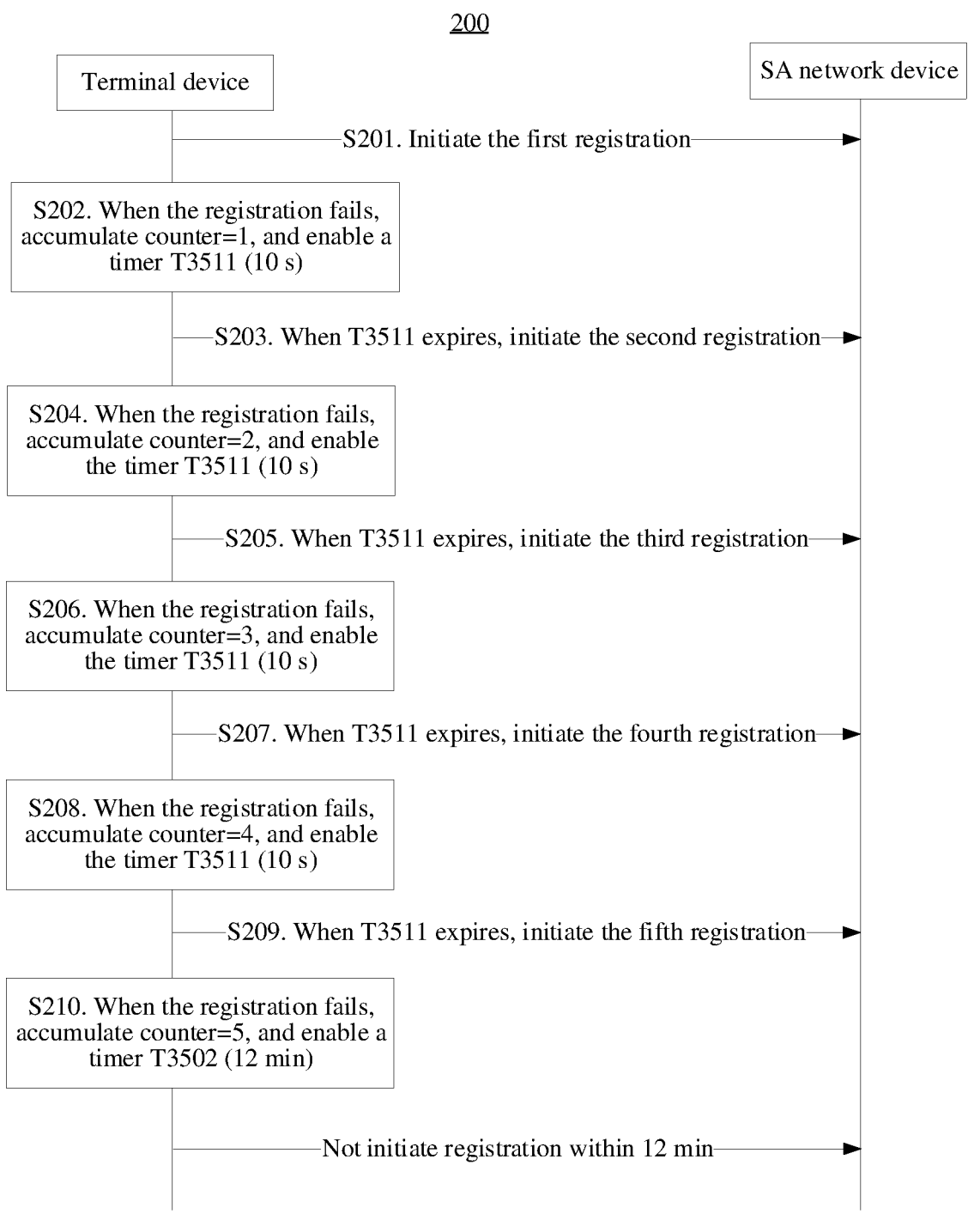
FIG. 3 is a schematic flowchart of a method for processing a network registration anomaly according to the related art.

Exemplarily, FIG. 3 is a schematic flowchart of a method 200 for processing a network registration anomaly according to the related art. The method 200 may be applied to the communication system shown in FIG. 1. Referring to FIG. 3, the method 200 may include the following steps S201 to S210. It should be noted that, for convenience of description, the registration attempt count is denoted by counter below.

S201. The terminal device initiates a registration with the SA network (referred to as a first registration).

Exemplarily, in a case that the terminal device sends the registration request to the SA network, the terminal device may enable the timer T3510, for example, a set duration is 15 seconds, and whether the registration is successful is determined according to whether a response message is received within the set duration. It should be noted that, the timer T3510 is enabled each time the terminal device initiates the registration request to the SA network.

On one hand, if the terminal device receives the registration accept message fed back by the SA network within 15 seconds after sending the registration request, the terminal device registers successfully. On the other hand, if the terminal device does not receive the response message to the registration request within 15 seconds after sending the registration request (for example, the core network device in the SA network does not respond to the registration request, and the T3510 expires accordingly), the terminal device fails to register. Therefore, the registration failure scenario is referred to as a T3510 timeout scenario. Certainly, the registration failure may also be caused by other causes, such as a registration failure due to a lower layer failure, and the registration failure due to the lower layer failure may be referred to as a lower layer failure scenario.

S202. If the registration fails, the terminal device accumulates counter=1, and enables the timer T3511.

The set duration of the timer T3511 is 10 seconds.

S203. If the timer T3511 expires, the terminal device initiates a registration with the SA network again (referred to as a second registration).

S204. If the registration fails, the terminal device accumulates counter=2, and enables the timer T3511.

Exemplarily, the terminal device may determine whether the registration is successful according to whether the response message is received within the set duration of the timer T3511. On one hand, if the terminal device receives the registration accept message fed back by the SA network within 10 seconds after sending the registration request, the terminal device registers successfully. On the other hand, if the terminal device does not receive the response message to the registration request within 10 seconds after sending the registration request (for example, the core network device in the SA network does not respond to the registration request), the terminal device fails to register.

S205. If the timer T3511 expires, the terminal device initiates a registration with the SA network again (referred to as a third registration).

S206. If the registration fails, the terminal device accumulates counter=3, and enables the timer T3511.

For a description of whether the terminal device successfully registers or fails to register, refer to a detailed description of a successful registration and a failed registration in the above S204, which is not repeated herein.

S207. If the timer T3511 expires, the terminal device initiates a registration with the SA network again (referred to as a fourth registration).

S208. If the registration fails, the terminal device accumulates counter=4, and enables the timer T3511.

For a description of whether the terminal device successfully registers or fails to register, refer to a detailed description of a successful registration and a failed registration in the above S204, which is not repeated herein.

S209. If the timer T3511 expires, the terminal device initiates a registration with the SA network again (referred to as a fifth registration).

S210. If the registration fails, the terminal device accumulates counter=5, and enables the timer T3502.

For a description of whether the terminal device successfully registers or fails to register, refer to a detailed description of a successful registration and a failed registration in the above S204, which is not repeated herein.

A duration corresponding to the timer T3502 is 12 minutes by default. The terminal device does not perform SA registration again within this duration. At this time, the terminal device may initiate registration with other networks. In a case that the timer T3502 expires, the terminal device may determine whether to initiate registration with the SA network again according to an actual situation. If the terminal device initiates registration with the SA network again, a specific registration process is still performed according to the foregoing registration procedures in S201 to S210.

The above network registration anomaly may be caused by a T3510 timeout during a process of the initial registration or mobile registration with the SA network (for example, the core network device does not respond to the registration request), or may be caused by the lower layer failure. Exemplarily, the following Table 1 shows processing manners in the related art if an anomaly occurs in registration. Referring to Table 1, in the foregoing solutions in the related art, in a case that an anomaly occurs in the process of registration with the SA network, the terminal device needs to wait for 10 seconds to re-initiate the registration according to the protocol. If the anomaly still occurs during re-registration, the terminal device needs to wait for another 10 seconds and to re-attempt. A maximum attempt is 5, and the SA registration process can only be ended after 5 failures, which takes more than 40 seconds. During this period, the terminal device is in a waiting state on the SA network, that is, regardless of the registration failure cause, the terminal device will continue to attempt to register with the SA network after waiting for a period of time as long as the registration fails. Therefore, in a case that there is always an anomaly if the terminal device initiates the registration with the SA network, the registration process is time-consuming, and the services cannot be quickly resumed.

TABLE 1

| No. | Regis-tration failure cause | Scenario stipulated in corresponding protocols | Processing manner in the related art |
|---|---|---|---|
| 1 | Lower layer failure | Lower layer failure | The terminal device accumulates a registration failure count. If the failure count is less than 5, the terminal device enables the timer T3511 (10 seconds), and re-initiates the registration after the timer expires. If the count is equal to 5, the terminal device enables the timer T3502 (12 minutes by default), and does not initiate the registration request to the SA network within a period of time. |
| 2 | No response of core network | T3510 timeout | |

In view of this, an embodiment of this application provides a method for processing a network registration anomaly. The method may be applied to the communication system shown in FIG. 1, and can solve a problem of frequent registration failures due to a network anomaly or a poor environmental signal in an SA network registration process, to escape early and fall back to the LTE network for registration, thereby reducing time affected by registration anomaly, and improving user service experience.

According to the method for processing a network registration anomaly provided in this embodiment of this application, in the SA network registration process, if an anomaly occurs in a registration, the terminal device obtains registration failure cause information and a cumulative failure count, to determine whether a condition for ending the registration early is met. If the condition is met, the SA registration process is ended early, and there is no need to re-attempt for five times according to the protocol, thereby quickly falling back to an LTE network to resume services. The condition for ending the registration early is that current registration failure cause information is preset cause information (cause), and a current registration attempt count (also referred to as a cumulative failure count) is greater than or equal to a preset count (n) corresponding to the preset cause information. Parameters cause and n can be flexibly customized. The preset cause information includes but is not limited to link establishment failure, random access failure, network releasing RRC link, T3510 timeout, and network delivering registration rejection in the registration process. The following describes the method for processing a network registration anomaly according to this embodiment of this application in detail with reference to the accompanying drawings.

FIG. 4 is a flowchart of a method for processing a network registration anomaly according to an embodiment of this application. The method may be applied to the communication system shown in FIG. 1. As shown in FIG. 4, the method 300 may include the following steps S310 to S350.

S310. The terminal device initiates an $M^{th}$ registration request to the 5G SA network.

M may be a positive integer less than N, and N may be a preset integer. Optionally, N may be negotiated by the terminal device and the 5G SA network or stipulated in the protocol (for example, N may be 5). This is not limited in this application. For convenience of description, the following uses N being 5 as an example for illustrative description.

Exemplarily, assuming that N=5, M may be 1, 2, 3, or 4. If M is 1, the terminal device initiates the first (that is, initial) registration request to the 5G SA network. If M is greater than 1 and less than 5, before the terminal device initiates the $M^{th}$ registration request to the 5G SA network, the terminal device fails to register with the 5G SA network for M−1 consecutive times. For example, if M is 2, the terminal device initiates the second registration request to the 5G SA network after the first registration with the 5G SA network fails. If M is 3, the terminal device initiates a third registration request to the 5G SA network after failing to register with the 5G SA network for two consecutive times. If M is 4, the terminal device initiates a fourth registration request to the 5G SA network after failing to register with the 5G SA network for three consecutive times.

It should be noted that, in this embodiment of this application, the terminal device initiates the registration request to the 5G SA network, which is actually implemented by sending a registration request message to the network element device in the 5G SA network. That is, the network registration process involves signaling interaction between the terminal device and the network element device in the network (such as a gNB or an access and mobility management function (access and mobility management function, AMF) network element). For convenience of description, some descriptions of the specific signaling interaction between the terminal device and the network element in the network are omitted below.

S320. In a case that the $M^{th}$ registration fails, the terminal device obtains cause information of the $M^{th}$ registration failure and a cumulative failure count M.

In this embodiment of this application, the cumulative failure count M is the count obtained by accumulating the failure count if the terminal device fails to register for M consecutive times. It may be understood that the terminal device counts once each time the terminal device fails to register with the 5G SA network, and accumulates to obtain the cumulative failure count 1 after the first registration fails. By analogy, after an $(M-1)^{th}$ registration failure, a cumulative failure count M−1 is accumulated. After an $M^{th}$ registration failure, the cumulative failure count M is accumulated. The cumulative failure count may also be referred to as a registration attempt count.

Exemplarily, if M is 1, in a case that the first registration fails, the terminal device may obtain cause information of the first registration failure and a cumulative failure count 1.

Still exemplarily, if M is 2, in a case that the first and the second registration fail, the terminal device may obtain cause information of the second registration failure and a cumulative failure count 2.

Still exemplarily, if M is 3, in a case that the registration fails for three consecutive times, the terminal device may obtain cause information of the third registration failure and a cumulative failure count 3.

Still exemplarily, if M is 4, in a case that the registration fails for four consecutive times, the terminal device may obtain cause information of the fourth registration failure and a cumulative failure count 4.

In some embodiments, in a process that the terminal device registers with the 5G SA network, the terminal device may update the current cumulative failure count to zero under some scenarios. Specific possible implementations for clearing the cumulative failure count include but are not limited to the following two manners:

Manner 1. In a case that the terminal device successfully registers with the 5G SA network, the terminal device may update the current cumulative failure count to zero.

Manner 2. If the terminal device is powered off or an airplane mode is turned on, the terminal device may update the current cumulative failure count to zero.

Optionally, a cause of the $M^{th}$ registration failure may be that the 5G SA network (such as the core network) does not respond to the registration request and the registration fails, or may be that the 5G SA network (such as the core network) feeds back a registration reject message and the registration fails. The registration failure may also be caused by a lower layer failure of the terminal device, or may be caused by any other possible cause, which may be determined according to actual applications. This is not limited in the embodiments of this application. There may be various situations in which the registration fails due to the lower layer failure of the terminal device, for example, the registration fails due to a link establishment failure, the registration fails due to a link release after established, or any other possible situation, which may be determined according to actual applications. This is not limited in the embodiments of this application.

Figure 5:
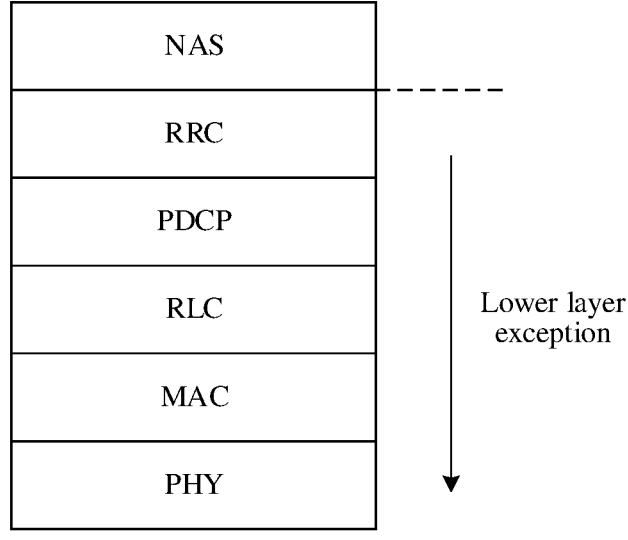
FIG. 5 is a schematic diagram of a system protocol stack architecture.

FIG. 5 is a schematic diagram of a system protocol stack architecture. For ease of description, only a plurality of layers related to the present solution are described. As shown in FIG. 5, the system protocol stack architecture includes a non-access stratum (non-access stratum, NAS) layer, an RRC layer, a PDCP layer, an RLC layer, a MAC layer, and a PHY layer from top to bottom. For ease of description, the NAS layer is referred to as an upper layer, and the RRC layer, the PDCP layer, the RLC layer, the MAC layer and the PHY layer are collectively referred to as a lower layer. As mentioned in the context, the lower layer link failure or the lower layer anomaly may mean that an anomaly occurs in one of the lower layers such as the RRC layer, the PDCP layer, the RLC layer, the MAC layer, and the PHY layer, or may mean that an anomaly occurs in a plurality of layers of these lower layers.

Exemplarily, the following Table 2 lists several related causes that may cause the terminal device to fail to register with the network, and scenarios stipulated in the protocol corresponding to the causes. As shown in Table 2, the causes related to the registration failure may include the following four items: (1) Causes related to link establishment failure (that is, the registration fails due to the link establishment failure), such as link failure, inter-system suspension, random access failure, and network loss. (2) Causes related to link release (that is, the registration fails due to the link release), such as recovery failure, link release, other causes, redirection from NR to LTE, upper layer anomaly, RRC anomaly, and bottom layer anomaly. (3) No response from the core network, that is, the registration fails due to no response from the network. (4) Core network rejection during the initial registration, that is, the registration fails due to registration reject from the network. The link establishment failure and link release correspond to situations in a scenario of the lower layer failure (lower layer failure) stipulated in the protocol, and no response from the core network corresponds to a situation in a scenario of the T3510 timeout (T3510 timeout) stipulated in the protocol.

TABLE 2

| No. | Registration failure cause | | Scenario stipulated in corresponding protocol |
|---|---|---|---|
| 1 | Cause related | Link failure | Lower layer failure |
| 2 | to link | Inter-system suspension | |
| 3 | establishment | Random access failure | |
| 4 | failure | Network loss | |
| 5 | Cause related | Recovery failure | |
| 6 | to link release | Network release link | |
| 7 | | Other causes | |
| 8 | | Redirection from NR to LTE | |
| 9 | | Upper layer anomaly | |
| 10 | | RRC anomaly | |
| 11 | | Lower layer anomaly | |
| 12 | No response of core network | | T3510 timeout |
| 13 | Core network rejection (#9 cause value) | | Not described in the protocol |

It should be noted that, the registration failure cause not described in the protocol are also listed in Table 2: core network rejection (#9 cause value). Although a scenario of being rejected by the network (#9 cause value) in the initial registration process is not described in the protocol, for an actual implementation of this scenario, reference may be made to the processing manners in the T3510 timeout scenario and the lower layer failure scenario.

Figure 6:
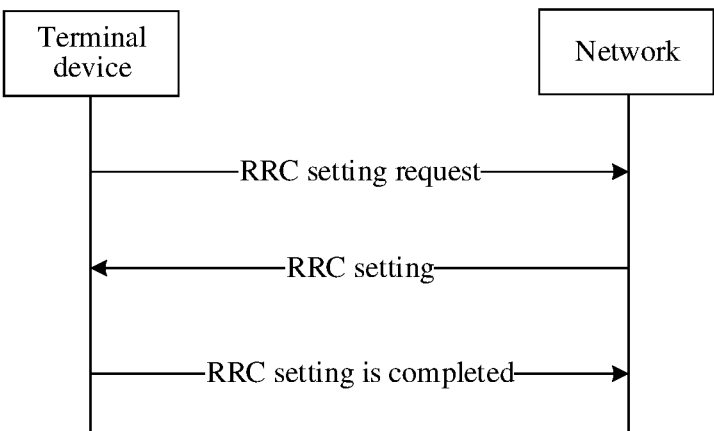
FIG. 6 is a schematic diagram of a signaling interaction for a terminal device and a network to establish a wireless link.

FIG. 6 schematically shows a flowchart of establishing a wireless link between the terminal device and the network (which may be referred to as link establishment for short). As shown in FIG. 6, the terminal device sends an RRC setting request to the network, the network sends an RRC setting parameter to the terminal device, and then the terminal device performs RRC setting according to the RRC setting parameter. After the RRC setting is completed, the terminal device establishes the wireless link with the network.

Referring to FIG. 2, FIG. 5, and FIG. 6, a precondition for the terminal device to successfully send the registration request message to the network is: the wireless link is successfully established between the terminal device and the radio access network RAN and the link is normal, mainly signaling interaction between the terminal device and the RRC layer. That is, in the registration process, the terminal device needs to establish a wireless link with the network before sending the registration request to the network. If an anomaly occurs in the RRC layer, a link establishment failure may occur, further causing the registration failure. In addition, before the network replies to the registration accept message, if the radio access network releases the wireless link, the registration also fails.

In addition, because the random access is a necessary process for establishing the wireless link between the terminal device and the radio access network, only after the random access is completed, a data interoperability between the access network device (base station) and the terminal device can be normally performed. Only after the random access is successful, the terminal device can send the RRC setting request to the radio access network RAN. This process is mainly represented by a related interaction between the RRC layer and layers below the RRC layer. Therefore, if the random access fails, a link establishment failure occurs, causing the registration failure.

In this embodiment of this application, cause information of the $M^{th}$ registration failure obtained by the terminal device may be air interface signaling or log information that can indicate any one of the foregoing causes. It should be noted that, for different registration failure causes, the terminal device obtains registration failure cause information in different manners. In the following, with reference to the foregoing Table 2, each registration failure cause is described in detail, and a possible implementation for the terminal device to obtain registration failure cause information corresponding to the registration is described.

First, causes related to the link establishment failure include causes related to RRC radio link establishment failure in the SA network registration process.

1) Link failure: It means that an anomaly occurs in the RRC layer, causing the link establishment failure. This anomaly may occur at any time during a connection establishment process in FIG. 6.

In this case, the registration failure cause information may be reflected in log (log) content generated during the registration process. For example, in the SA network registration process, if the terminal device fails in link establishment, the RRC layer replies a link establishment failure message to the NAS layer, and the interactive message is recorded to generate the log content, from which it can be known that the RRC link failure causes the link establishment failure. Correspondingly, the terminal device may obtain the registration failure cause information from the log content.

2) Inter-system suspension: It means that the terminal device is switched from the SA network system to an inter-system (such as the LTE network) during the link establishment process, a process of registering with the SA network is interrupted, and the RRC needs to be suspended, causing the link establishment failure.

In this case, the registration failure cause information may be reflected in the log content generated during the registration process. For example, in the SA network registration process, if the terminal device fails in link establishment, and then resides in other systems (such as the LTE network), these phenomena are recorded to generate the log content, from which it can be known that the inter-system suspension causes the link establishment failure. Correspondingly, the terminal device may obtain the registration failure cause information from the log content.

3) Random access failure: It refers to the random access failure during the link establishment process, causing the link establishment failure.

In this case, the registration failure cause information may be reflected in the log content generated during the registration process. For example, in the SA network registration process, a random access related message during link establishment of the terminal device may indicate a random access failure, or the random access process message is incomplete. These messages or phenomena are recorded to generate the log content, from which it can be known that the random access failure causes the link establishment failure. Correspondingly, the terminal device may obtain the registration failure cause information from the log content.

4) Network loss: It means that network signal quality does not meet a residency condition during the link establishment process, and network loss occurs, causing the link establishment failure.

In this case, the registration failure cause information may be reflected in the log content generated during the registration process. For example, in the SA network registration process, the terminal device fails in link establishment, and signal quality of the SA network is lower than a threshold, which does not meet a residency criterion. These are recorded to generate the log content, from which it can be known that the network loss causes the link establishment failure. Correspondingly, the terminal device may obtain the registration failure cause information from the log content.

Second, causes related to the link release include causes related to why the RRC radio link is released after the RRC radio link is successfully established in the SA network registration process.

5) Recovery failure: It refers to a failure to recover the link if the RRC link changes from an inactive state (RRC_INACTIVE) to a connected state (RRC_CONNECTED), causing the link to be released.

This scenario may be observed from the air interface signaling. In the SA network registration process, if the RRC link is in the inactive state, the terminal device does not send an RRC resume request (RRC resume request) message or an RRC resume complete (RRC resume complete) message.

6) Link release: RRC link connection fails, causing the link to be released.

This scenario cannot be directly observed from the air interface signaling, but can be observed from the log or phenomenon: in the SA network registration process, after the RRC link is established, if a lower layer below the RRC layer (such as the RLC layer, MAC layer, or PHY layer) loses synchronization or fails to access, a link anomaly is reported to the RRC layer.

7) Other causes: It means that the network voluntarily releases the link before replying to the registration accept or registration reject message after the link is successfully established.

This scenario may be observed from the air interface signaling. In the SA network registration process, after the RRC link is established, the network delivers an RRC Release (RRC Release) message, which does not carry information such as suspension or redirection, and directly releases the RRC link.

8) Redirection from NR to LTE: It refers to the link release due to the redirection from NR to LTE.

In this scenario, the air interface signaling can be observed. In the SA network registration process, after the RRC link is established, the network delivers an RRC Release message, which carries information about redirection to LTE.

9) Upper layer anomaly: An anomaly occurs in the NAS layer, causing the link to be released.

This scenario cannot be directly observed from the air interface signaling, but can be observed from the log or phenomenon: in the SA network registration process, after the RRC link is established, an anomaly occurs in the NAS layer, which instructs the RRC layer to release the RRC link.

10) RRC anomaly: An anomaly occurs in the RRC layer, causing the link to be released.

This scenario cannot be directly observed from the air interface signaling, but can be observed from the log or phenomenon: in the SA network registration process, after the RRC link is established, an anomaly occurs in the RRC layer, and the RRC link is directly released.

11) Lower layer anomaly: It means that an anomaly occurs in the lower layer (such as MAC, PDCP, or PHY), causing the link to be released.

This scenario cannot be directly observed from the air interface signaling, but can be observed from the log or phenomenon: in the SA network registration process, after the RRC link is established, an anomaly occurs in the lower layer, and the anomaly is reported to the RRC layer, causing the RRC link to be released.

Third, T3510 timeout: After the terminal device sends the registration request message to the network, the network does not reply registration accept (REGISTRATION ACCEPT) or registration reject (REGISTRATION REJECT).

Fourth, core network rejection: If the initial registration request initiated by the terminal device is not correctly received by the network, the network sends a registration reject message to the terminal device, and the message includes a cause value of the rejection. After the terminal device sends the registration request message to the network, the network sends the registration reject message to the terminal device, and the message includes the cause value of the rejection. For example, the cause value is #9 cause value.

S330. The terminal device determines whether the cause information of the $M^{th}$ registration failure conforms to the first preset cause information, and whether the cumulative failure count M is greater than or equal to a first preset count corresponding to the first preset cause information.

The foregoing "conform" may be understood as complete or partial equivalence of the information. Exemplarily, if a similarity obtained by comparing information 1 and information 2 is greater than or equal to a preset similarity threshold (for example, 80%), it can be considered that these two pieces of information are consistent. If the similarity obtained by comparing information 1 and information 2 is less than the preset similarity threshold, it can be considered that the two pieces of information are inconsistent. Specifically, it can be determined according to actual use requirements, and this is not limited in this embodiment of this application.

Optionally, in this embodiment of this application, the first preset cause information may indicate that the registration fails due to the link establishment failure (or indicate that the link fails to be established), or may indicate that the registration fails due to the link released after being established (or indicate that the link is released). The first preset cause information may also indicate that the registration fails due to no response from the 5G SA network, or may indicate that the registration fails due to the registration reject from the 5G SA network. Alternatively, the first preset cause information may indicate any one of the 13 registration failure causes listed in Table 2 above. For ease of description, the following only uses some of the registration failure causes for exemplary description.

In some embodiments, the terminal device may pre-store at least one correspondence, and each correspondence is a correspondence among the preset cause information, the preset count, and the processing policy. Exemplarily, the at least one correspondence includes a correspondence among the first preset cause information, the first preset count, and the first processing policy, and a correspondence among second preset cause information, a second preset count, and the first processing policy. The first processing policy may be that the terminal device stops initiating the registration request to the 5G SA network, and initiates the registration request to the second network. Exemplarily, referring to a correspondence list or a preset cause information list shown in the following Table 3, the correspondence list exemplarily shows three correspondences: if the preset cause information indicates the link failure, the corresponding preset count is 2, and the corresponding processing policy is the first processing policy; if the preset cause information indicates the random access failure, the corresponding preset count is 2, and the corresponding processing policy is the first processing policy; and if the preset cause information indicates the link release, the corresponding preset count is 1, and the corresponding processing policy is the first processing policy.

TABLE 3

| Preset cause information | Preset count | Processing policy |
|---|---|---|
| Indicate the link failure | 2 | The terminal device stops |
| Indicate the random access failure | 2 | initiating the registration request to the 5G SA network |
| Indicate the link release | 1 | and, initiates the registration request to the second network |

It should be noted that, for ease of description, the foregoing Table 3 only lists three different types of preset cause information and corresponding preset counts. It may be understood that in actual implementation, the preset counts corresponding to these three types of preset cause information can be set according to an actual situation. In addition, other preset cause information and corresponding preset counts different from these three types of preset cause information can also be set according to an actual situation. These can be negotiated by the terminal device and the network or stipulated by the protocol. This is not limited in this application.

It should be further noted that the above uses an example in which three different types of preset cause information all correspond to the same processing policy for illustrative description. This embodiment of this application may further include the following implementations: different preset cause information may respectively correspond to different processing policies. For example, if the preset cause information indicates the random access failure, the corresponding processing policy may be that the terminal device stops initiating the registration request to the 5G SA network, and initiates the registration request to the second network. If the preset cause information indicates the link release, the corresponding processing policy may be that the terminal device initiates the registration request to the 5G SA network, and initiates the registration request to the second network. In this way, a racing registration is achieved by initiating registration requests to both networks, and a network that is successfully registered with first is used as a resident network.

In some embodiments, a relationship among the preset cause information, the corresponding preset count, and the processing policy can be set in combination with factors such as a network situation, terminal device performance, and service impact, and can also be adjusted according to a change of the network situation. Optionally, a specific setting of the relationship may also be comprehensively considered by analyzing a large number of logs related to the problems, and taking into account different locations, network situations of different device vendors, impact of terminal device services, or the like.

In the above S330, in a case that the terminal device fails to register, the terminal device may respectively compare the cause information of the $M^{th}$ registration failure and the cumulative failure count M with the preset cause information and the preset count in the foregoing pre-stored relationship list, to determine whether the cause information of the $M^{th}$ registration failure conforms to the first preset cause information, and whether the cumulative failure count M is greater than or equal to the first preset count corresponding to the first preset cause information, that is, to determine whether a current registration anomaly scenario meets the condition for ending the registration early.

In some embodiments, the terminal device may first determine whether the cause information of the $M^{th}$ registration failure conforms to the first preset cause information, and if the cause information of the $M^{th}$ registration failure conforms to the first preset cause information, the terminal device determines the first preset count corresponding to the S340. The terminal device stops initiating the registration request to the 5G SA network, and initiates the registration request to a second network different from the 5G SA network.

In this embodiment of this application, if the cause information of the $M^{th}$ registration failure conforms to first preset cause information, and the cumulative failure count M is greater than or equal to the first preset count corresponding to the first preset cause information, the terminal device may execute a first processing policy corresponding to the first preset cause information. That is, in a case that the terminal device fails to register with the 5G SA network for consecutive times, if it is determined that the current registration anomaly scenario meets the condition for ending the registration early according to the registration failure cause information and the cumulative failure count, the terminal device may temporarily stop initiating the registration request to the 5G SA network, and may initiate the registration request to the second network at this time.

In this embodiment of this application, Table 4 shows the processing manners according to this application and the processing manners in the related art in the scenario in which the registration fails due to different causes. C indicates the cumulative failure count, for example, C=2 indicates that the cumulative failure count is 2.

TABLE 4

| No. | Registration failure cause | | Processing manner in this application | Processing manner in the related art |
|---|---|---|---|---|
| 1 | Cause related to link establishment failure | Link failure | If C = 2, end the registration early | The terminal device accumulates a registration failure count. If the registration failure count is less than 5, the terminal device enables the timer T3511 (10 seconds), and re-initiates the registration after the timer expires. If the registration failure count is equal to 5, the terminal device enables the timer T3502 (12 minutes by default), and the terminal device does not initiate the registration request to the SA network within a period of time. |
| 2 | | Inter-system suspension | Design according to requirement | |
| 3 | | Random access failure | If C = 2, end the registration early | |
| 4 | | Network loss | Design according to requirement | |
| 5 | Cause related to link release | Recovery failure | Design according to requirement | |
| 6 | | Link release | If C = 1, end the registration early | |
| 7 | | Other causes | Design according to requirement | |
| 8 | | Redirection from NR to LTE | Design according to requirement | |
| 9 | | Upper layer anomaly | Design according to requirement | |
| 10 | | RRC anomaly | Design according to requirement | |
| 11 | | Lower layer anomaly | Design according to requirement | |
| 12 | No response of core network | | Design according to requirement | |
| 13 | Core network rejection (#9 cause value) | | Design according to requirement | | first preset cause information according to the first correspondence. Then, the terminal device compares the cumulative failure count M with the first preset count, and determines whether the cumulative failure count M is greater than or equal to the first preset count.

If the terminal device determines that the cause information of the $M^{th}$ registration failure conforms to the first preset cause information, and the cumulative failure count M is greater than or equal to the first preset count corresponding to the first preset cause information, that is, meets the condition for ending the registration early, the terminal device continues to perform the following S340. Otherwise, the terminal device continues to perform the following S350.

As can be seen from Table 4, in the processing manner in the related art, in a case that an anomaly occurs in the process of registration with the SA network, the terminal device needs to wait for 10 seconds to re-initiate the registration according to the protocol. If the anomaly still occurs during re-registration, the terminal device needs to wait for another 10 seconds and to re-attempt. A maximum attempt is 5, and the SA registration process can only be ended after 5 failures, which takes more than 40 seconds. During this period, the terminal device is in a waiting state on the SA network, that is, regardless of the registration failure cause, the terminal device will continue to attempt to register with the SA network after waiting for a period of time as long as the registration fails. Different from the related art, according to the processing manner in this application, in a case that an anomaly occurs in a process that the terminal device registers with the SA network, the terminal device obtains the registration failure cause information and the cumulative failure count, so as to determine whether the condition for ending the registration early is met. If the condition is met, the current round of SA network registration can be ended early. At this time, the terminal device can register with another network (LTE network) to perform services to achieve quick escape.

In view of this, the solutions of this application can solve a problem of frequent registration failures due to a network anomaly or a poor environmental signal in an SA network registration process, to escape early and fall back to the LTE network for registration, thereby reducing time affected by registration anomaly, and improving user service experience.

Optionally, the step that the terminal device initiates the registration request to the second network in the foregoing S340 may be implemented in any one of the following two manners:

Manner 1. In a case that the terminal device ends the registration early and registers with the second network after failing to register with the 5G SA network, the second network may be stipulated by the protocol, or may be negotiated by the terminal device and the 5G SA network. Exemplarily, using an example in which the second network stipulated by the protocol is the LTE network, if the terminal device fails to register with the 5G SA network and meets the condition for ending the registration early, the terminal device may register with the LTE network at this time according to the protocol.

Manner 2. The terminal device searches for at least one available network other than the 5G SA network, and the at least one available network includes the second network. In addition, the terminal device obtains a reference signal received quality parameter of each network in the at least one available network. If signal quality indicated by the reference signal received quality parameter of the second network in the at least one available network is optimal, the terminal device initiates a registration request to the second network. That is, the terminal device may select a network with the best network signal quality from a plurality of searched available networks to initiate the registration.

Optionally, the reference signal received quality parameter may include but is not limited to at least one of the following parameters: received signal strength indication (received signal strength indication, RSSI), reference signal received power (reference signal received power, RSRP), and signal-to-noise ratio (signal-to-noise ratio, SNR).

It should be noted that, even if the network signal quality of the at least one available network searched by the terminal device is worse than that of the 5G SA network, as long as the network signal quality meets the minimum access quality given by the network, the terminal device can still choose to register with the at least one available network.

Optionally, in this embodiment of this application, the second network may be an LTE network. Exemplarily, in a case that a mobile phone fails to register with the 5G SA network for consecutive times, if it is determined that a current registration anomaly scenario meets a condition for ending the registration early according to the registration failure cause information and the cumulative failure count, the mobile phone stops initiating the registration request to the 5G SA network, and may initiate the registration request to the LTE network at this time. Therefore, according to the method for processing a network registration anomaly provided in this application, the mobile phone can quickly escape if an anomaly occurs in the 5G SA network registration process, and fall back to the LTE network for registration, thereby reducing time affected by registration anomaly and improving user service experience.

S350. The terminal device initiates an $(M+1)^{th}$ registration request to the 5G SA network after a first waiting duration.

In some embodiments, if the cause information of the $M^{th}$ registration failure does not conform to the first preset cause information, or if the cause information of the $M^{th}$ registration failure conforms to the first preset cause information and the cumulative failure count M is less than the first preset count, the terminal device may initiate an $(M+1)^{th}$ registration request to the 5G SA network after a first waiting duration.

The first waiting duration may be negotiated by the terminal device and the network or stipulated in the protocol. This is not limited in this application. For example, the first waiting duration may be 10 seconds.

In some embodiments, in a case that the current registration anomaly scenario meets the condition for ending the registration early, the SA network may be penalized, for example, an SA capability is disabled, that is, an SA registration is not initiated within a period of time. A progressive penalty method may be used, a first penalty duration is T1, a second penalty duration is T2, a third penalty duration is T3, and so on. T3>T2>T1, and the parameters T1, T2, and T3 can be customized according to requirements. After a penalty duration expires, the SA capability may be resumed, and the terminal device customizes a parameter to decide whether to immediately initiate the SA registration.

Specifically, a corresponding penalty duration may be preset for the preset cause information. Accordingly, if the terminal device meets the condition for ending the registration early, initiating the registration request to the 5G SA network is suspended within the preset penalty duration. Exemplarily, a first preset penalty duration may be correspondingly set for the first preset cause information. Specifically, if the cause information of the $M^{th}$ registration failure conforms to the first preset cause information, and the cumulative failure count M is greater than or equal to the first preset count corresponding to the first preset cause information, that is, the condition for ending the registration early is met, the terminal device may prohibit initiating the registration request to the 5G SA network within the first preset penalty duration corresponding to the first preset cause information.

The first preset penalty duration may be negotiated by the terminal device and the network or stipulated in the protocol. This is not limited in this application. The protocol may stipulate that the first preset penalty duration is greater than the first waiting duration. For example, the first preset penalty duration may be 12 minutes.

Optionally, different preset cause information may correspondingly set with different preset penalty durations. For example, if the preset cause information indicates that the registration fails due to the link failure, the corresponding preset penalty duration may be 12 minutes. If the preset cause information indicates that the registration fails due to the link release, the corresponding preset penalty duration may be 15 minutes, which can be determined according to actual use requirements, and is not limited in this application.

According to the method for processing a network registration anomaly provided in the embodiments of this application, if an anomaly occurs in a network registration, a terminal device may obtain registration failure cause information and a cumulative failure count, to determine whether a condition for ending the registration early is met. If the condition is met, a registration process is ended early, there is no need to re-attempt for a plurality of times according to a protocol, and another network can be registered with to quickly resume services at this time. Therefore, according to the solution of this application, an abnormal registration can be ended early and another network is registered with if an anomaly occurs in a network registration, to reduce time affected by registration anomaly, thereby solving a problem of frequent registration failures due to a network anomaly or a poor environmental signal in the network registration process, and improving user service experience.

In some embodiments, with reference to FIG. 4, as shown in FIG. 7, after S350, the method 300 may further include the following steps S360 to S380.

S360. In a case that the terminal device fails to register with the 5G SA network for the $(M+1)^{th}$ time, the terminal device obtains cause information of the $(M+1)^{th}$ registration failure and a cumulative failure count M+1.

For a detailed description of how the terminal device obtains the cause information of the $(M+1)^{th}$ registration failure and the cumulative failure count M+1, reference may be made to the foregoing step S320, in which the terminal device obtains the cause information of the $M^{th}$ registration failure and the cumulative failure count M. The detailed description is not repeated herein.

S370. The terminal device determines whether the cause information of the $(M+1)^{th}$ registration failure conforms to second preset cause information, and whether the cumulative failure count M+1 is greater than or equal to a second preset count corresponding to the second preset cause information.

If the cause information of the $(M+1)^{th}$ registration failure conforms to the second preset cause information, and the cumulative failure count M+1 is greater than or equal to the second preset count corresponding to the second preset cause information, the terminal device continues to perform the following step S380. Otherwise, the terminal device may wait to continue to register with the 5G SA network, for example, the terminal device may initiate the registration request to the 5G SA network after the first waiting duration.

S380. The terminal device executes the first processing policy corresponding to the second preset cause information.

For the description of the second preset cause information, the corresponding second preset count, and the corresponding first processing policy, reference may be made to the foregoing detailed description of the first preset cause information, the corresponding first preset count, and the corresponding first processing policy. The detailed description is not repeated herein.

It should be noted that, the second preset cause information and the first preset cause information may be the same or different. In the same situation, the second preset count is the first preset count.

In some embodiments, after the terminal device successfully registers with the second network, and after the first preset penalty duration, if a condition is met, the terminal device may return to the 5G SA network for registration. The following exemplarily describes three possible implementations.

Manner 1. The terminal device may autonomously return to the 5G SA network. For example, the protocol may stipulate that after the first preset penalty duration, the terminal device may autonomously return to the 5G SA network for registration.

Manner 2. The 5G SA network may instruct the terminal device to return to the 5G SA network.

After the first preset penalty duration, the 5G SA network may send instruction information to the terminal device, instructing the terminal device to return to the 5G SA network. After receiving the instruction information sent by the 5G SA network, the terminal device may initiate the registration request to the 5G SA network according to the instruction information, and the instruction information is used to instruct to initiate the registration request to the 5G SA network.

Manner 3. The second network may instruct the terminal device to return to the 5G SA network.

For example, assuming that the terminal device currently resides in the second network, the terminal device collects the reference signal received quality parameter of the second network and the reference signal received quality parameters of other networks (including the 5G SA network) in real time, and reports the reference signal received quality parameters to the second network. The second network determines the reference signal received quality of each network according to the reference signal received quality parameter of each network, and then determines the network in which the terminal device is suitable to reside. The protocol may stipulate that the second network instructs the terminal device to return to the 5G SA network for registration in a case that the second network determines that the reference signal received quality of the 5G SA network is better than that of the second network.

In another example, the protocol may stipulate that after the first preset penalty duration, the second network instructs the terminal device to return to the 5G SA network for registration.

In some embodiments, in a case that the terminal device returns to the 5G SA network for registration, if the registration fails for the same cause, the terminal device may increase the penalty duration. Exemplarily, in a case that the terminal device fails to register with the 5G SA network for M consecutive times and registration failure cause information of the $M^{th}$ registration failure conforms to the first preset cause information, the terminal device prohibits initiating the registration request to the 5G SA network within a second preset penalty duration. The second preset penalty duration is greater than the first preset penalty duration. Optionally, the second preset penalty duration may be negotiated by the terminal device and the 5G SA network or stipulated in the protocol. This is not limited in this application.

For example, assuming that the preset count corresponding to the first preset cause information is 2, in a case that the terminal device fails to register with the 5G SA network for two consecutive times and the registration failure cause information of the second registration failure conforms to the first preset cause information, the terminal device prohibits initiating the registration request to the 5G SA network within 12 minutes, and registers with the LTE network at this time. Further, if the terminal device returns to the 5G SA network for registration, if the terminal device fails to register with the 5G SA network for two consecutive times and the registration failure cause information of the second registration failure still conforms to the first preset cause information, the terminal device prohibits initiating the registration request to the 5G SA network within 2 hours.

The penalty duration is increased from 12 minutes to 2 hours, which can reduce time that user service is affected.

In view of the possible problems under the registration anomaly scenarios mentioned above, considering the actual user experience, the following designs corresponding processing policies for the scenarios in which the registration fails due to the link establishment failure, the random access failure, or the link release. Refer to description of the following embodiments (a first embodiment to a third embodiment) for specific implementation. The following embodiments are all exemplarily described by using an example in which the second network is the LTE network. It should be noted that, scenarios implemented by a current product are a subset of an entire solution. Certainly, different policies may further be customized for other scenarios. The following specific embodiments do not represent the entire solution of this solution.

First Embodiment: Scenario in which the Registration Fails Due to the Link Failure In the first embodiment, an escape design is performed for the scenario in which the registration fails due to the link failure in the registration process (that is, if the 5G SA network registration is unsuccessful, the second network is registered with). Assuming that the preset cause information indicates that the registration fails due to the link failure, a corresponding preset count is 2; and assuming that a progressive penalty policy is: the SA network is penalized for 12 minutes (that is, the first preset penalty duration) in the first round, and penalized for 2 hours (that is, the second preset penalty duration) in the second round and each subsequent round. Exemplarily, if the cause of the second registration failure is the link failure in the first round of registration process, the terminal device determines that the condition for ending the registration early is currently met, ends the SA network registration process, and penalizes the SA network, where the first penalty duration is 12 minutes. After timeout (after 12 minutes), the terminal device may resume the SA capability and re-initiate the registration to the SA network. In the second round of registration process, if the cause of the second registration failure is still the link failure, the terminal device ends the SA registration process early and penalizes the SA network for 2 hours. For ease of description, the following uses C to represent a value of the cumulative failure count.

Figure 8:
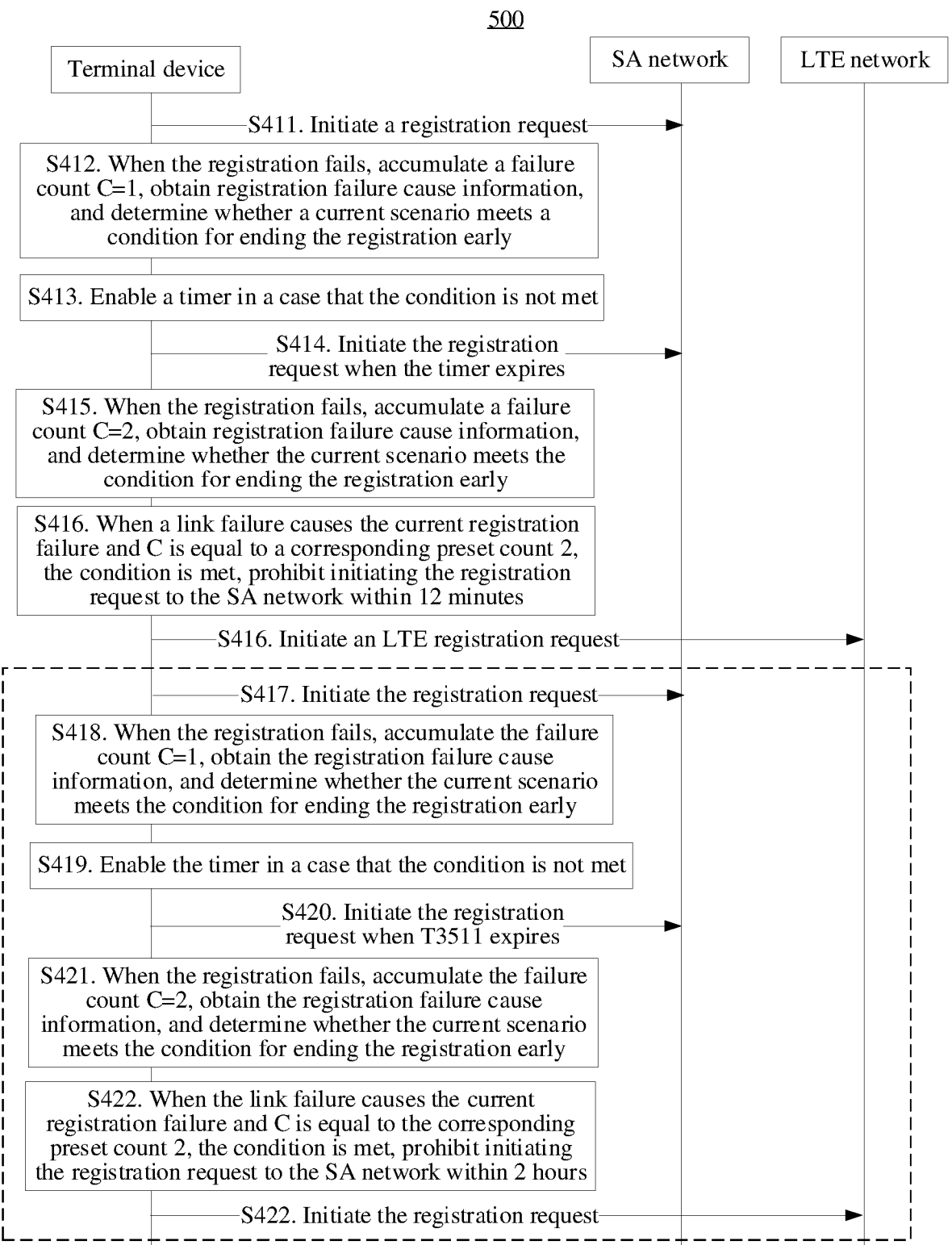
FIG. 8 is a schematic flowchart of a method for processing a network registration anomaly according to an embodiment of this application that is applied to a scenario in which a link failure causes a registration failure.

FIG. 8 is a schematic flowchart of the method for processing a network registration anomaly according to an embodiment of this application that is applied to a scenario in which the link failure causes the registration failure. As shown in FIG. 8, the method 400 may include the following steps S411 to S422.

S411. The terminal device initiates the registration request to the SA network.

If the terminal device is powered on (assuming that the terminal device accesses the SA network by default after being powered on) or is switched from an inter-system to the SA network, the terminal device initiates the registration request to the SA network to access the SA network.

S412. If the registration fails, the terminal device accumulates the failure count C=1, obtains the registration failure cause information, and determines whether the current registration anomaly scenario meets the condition for ending the registration early.

The terminal device may determine whether the current registration anomaly scenario meets the condition for ending the registration early according to the registration failure cause information and the cumulative failure count. Exemplarily, if it is determined that the current registration fails due to the link failure and the cumulative failure count C is greater than or equal to the corresponding preset count 2, it may be determined that the current registration anomaly scenario meets the condition for ending the registration early. If it is determined that the current registration anomaly scenario meets the condition for ending the registration early, the terminal device continues to perform the following S413. If it is determined that the current registration anomaly scenario does not meet the condition for ending the registration early, the terminal device may enable a timer (for example, T3511), wait in the SA network, and continue to attempt to register after the timeout.

The registration fails due to some causes during the registration process, but the current registration anomaly scenario may not meet the condition for ending the registration early, because the cause of the current registration failure may not be a cause in the preset cause information list, or the cause may be a cause (for example, the cause may be that a link establishment anomaly, no response from the network, or network rejection) in the preset cause information list, but the cumulative failure count does not reach the corresponding preset count. Therefore, the current registration anomaly scenario does not meet the condition for ending the registration early, and the terminal device may continue to attempt to register with the SA network.

S413. If the condition for ending the registration early is not met, the terminal device enables a timer.

Exemplarily, if the registration fails and the current registration anomaly scenario does not meet the condition for ending the registration early, the terminal device enables a timer T3511 with a duration of 10 seconds (corresponding to the first waiting duration), during which the terminal device waits in the SA network, and may continue to attempt to register with the SA network after 10 seconds.

S414. If the timer expires, the terminal device initiates the registration request to the SA network.

Exemplarily, the timer T3511 expires after 10 seconds, and the terminal device re-initiates the registration request to the SA network.

S415. If the registration fails, the terminal device accumulates the failure count C=2, obtains the registration failure cause information, and determines whether the current registration anomaly scenario meets the condition for ending the registration early.

Exemplarily, if the registration failure cause information indicates that the random access failure causes the current registration failure, and the cumulative failure count C is greater than or equal to the preset count 2, it may be determined that the current registration anomaly scenario meets the condition for ending the registration early.

S416. If the link failure causes the current registration failure and the cumulative failure count is equal to the corresponding preset count 2, the condition for ending the registration early is met, the terminal device prohibits initiating the registration request to the SA network within 12 minutes, and initiates the registration request to the LTE network.

Because the link failure that causes the current registration failure conforms to the preset cause information, and the cumulative failure count is equal to the corresponding preset count 2, the condition for ending the registration early is met. Therefore, the terminal device may quickly escape to another network for registration.

From the related technical solutions, if failing to register for two consecutive times, the terminal device accumulates the failure count C=2, and enables the timer T3511 with a duration of 10 seconds, during which the terminal device waits in the SA network, and continues to attempt to register. Different from the related art, in this application, if failing to register for two consecutive times due to the link failure, the terminal device may end the current round of SA network registration early, penalize the SA network for 12 minutes, disable the SA capability, and not initiate the registration on the SA network. At this time, the terminal device may fall back to the LTE network for registration to perform services to achieve quick escape.

In this way, in a case that an anomaly occurs in the SA network registration process, if the cause of the second anomaly is a link failure scenario, the terminal device may end the SA network registration process early and fall back to the LTE network for registration, reducing time that user service is affected.

After the terminal device registers with the LTE network, the penalty duration for the SA network ends, that is, after 12 minutes, the terminal device resumes the SA capability, and may return to the SA network for registration again, and perform steps S417 to S422. For description of S417 to S422, refer to the foregoing detailed description of S411 to S416, which is not repeated herein.

S411 to S416 may be considered as the first round of registration process, and S417 to S422 may be considered as the second round of registration process. Certainly, there may be more rounds of registration processes. Different from the first round of registration process, a penalty duration of the second round of registration process is increased to reduce time affected by registration anomaly. For details, refer to S422. If the link failure causes the current registration failure and the cumulative failure count is equal to the corresponding preset count 2, the terminal device prohibits initiating the registration request to the SA network within 2 hours, and initiates the registration request to the LTE network. The penalty duration is increased from 12 minutes to 2 hours.

In the related art, if failing to register for the second time, the terminal device accumulates the failure count C=2, and enables the timer T3511 with a duration of 10 seconds, during which the terminal device waits in the SA network. Different from the related art, according to this application, the terminal device may end the current round of SA network registration early in the second round of registration process at this time, penalize the SA network for 2 hours, disable the SA capability, and not initiate the registration on the SA network. At this time, the terminal device may fall back to the LTE network for registration to perform services to achieve quick escape.

In the solution provided in the first embodiment, according to this application, the SA network registration process may be ended early if the cause of the second failure in the registration process is the link failure, and it is not necessary to continue to accumulate the registration attempt count (corresponding to the cumulative failure count). In addition, the SA network is progressively penalized, and a penalty duration is 12 minutes in the first round. In the second round and each subsequent round, a penalty duration is 2 hours. Compared with a 12-minute prohibition after five unsuccessful registration attempts in the related art, the penalty duration is increased to 2 hours, thereby reducing the impact on user services by reducing time affected by registration anomaly. Therefore, in this application, the terminal device may quickly escape to the LTE network for registration if an anomaly occurs in the 5G SA network registration, thereby reducing time affected by registration anomaly and improving user service experience.

Second Embodiment: Scenario in which the Registration Fails Due to the Random Access Failure In the second embodiment, an escape design is performed for the scenario in which the registration fails due to the random access failure in the registration process (that is, if the 5G SA network registration is unsuccessful, the second network is registered with). Assuming that the preset cause information indicates that the registration fails due to the random access failure, a corresponding preset count is 2; and assuming that a progressive penalty policy is: the SA network is penalized for 12 minutes (that is, the first preset penalty duration) in the first round, and penalized for 2 hours (that is, the second preset penalty duration) in the second and each subsequent round. Exemplarily, if the cause of the second registration failure is the random access failure in the first round of registration process, the terminal device determines that the condition for ending the registration early is currently met, ends the SA network registration process, and penalizes the SA network, where the first penalty duration is 12 minutes. After the penalty expires (after 12 minutes), the terminal device may resume the SA capability and re-initiate the registration request to the SA network. In the second round of registration process, if the cause of the second registration failure is still the random access failure, the terminal device ends the SA registration process early and penalizes the SA network for 2 hours.

FIG. 9 is a schematic flowchart of the method for processing a network registration anomaly according to an embodiment of this application that is applied to a scenario in which the random access failure causes the registration failure. As shown in FIG. 9, the method 500 includes the following steps S511 to S522.

S511. The terminal device initiates the registration request to the SA network.

If the terminal device is powered on or is switched from an inter-system to the SA network, the terminal device initiates the registration request to the SA network to access the SA network.

S512. If the registration fails, the terminal device accumulates the failure count C=1, obtains the registration failure cause information, and determines whether the current registration anomaly scenario meets the condition for ending the registration early.

The terminal device may determine whether the current registration anomaly scenario meets the condition for ending the registration early according to the registration failure cause information and the cumulative failure count. Exemplarily, if it is determined that the current registration fails due to the random access failure and the cumulative failure count C is greater than or equal to the corresponding preset count 2, it may be determined that the current registration anomaly scenario meets the condition for ending the registration early. If it is determined that the current registration anomaly scenario meets the condition for ending the registration early, the terminal device continues to perform the following S513. If it is determined that the current registration anomaly scenario does not meet the condition for ending the registration early, the terminal device may enable a timer (for example, T3511), wait in the SA network, and continue to attempt to register after the timeout.

The registration fails due to some causes during the registration process, but the current registration anomaly scenario does not meet the condition for ending the registration early, because the cause of the current registration failure may not be a cause in the preset cause information list, or the cause may be a cause (for example, the cause may be that a link establishment anomaly, no response from the network, or network rejection) in the preset cause information list, but the cumulative failure count does not reach the corresponding preset count. Therefore, the current registration anomaly scenario does not meet the condition for ending the registration early, and the terminal device may continue to attempt to register with the SA network.

S513. If the condition for ending the registration early is not met, the terminal device enables a timer.

Exemplarily, if the registration fails and the current registration anomaly scenario does not meet the condition for ending the registration early, the terminal device enables a timer T3511 with a duration of 10 seconds (corresponding to the first waiting duration), during which the terminal device waits in the SA network.

S514. If the timer expires, the terminal device initiates the registration request to the SA network.

Exemplarily, the timer T3511 expires after 10 seconds, and the terminal device re-initiates the registration request to the SA network.

S515. If the registration fails, the terminal device obtains accumulates the failure count C=2, obtains the registration failure cause information, and determines whether the current registration anomaly scenario meets the condition for ending the registration early.

Exemplarily, if the registration failure cause information indicates that the random access failure causes the current registration failure, and the cumulative failure count C is greater than or equal to the preset count 2, it may be determined that the current registration anomaly scenario meets the condition for ending the registration early.

S516. If the random access failure causes the current registration failure and the cumulative failure count is equal to the corresponding preset count 2, the condition for ending the registration early is met, the terminal device prohibits initiating the registration request to the SA network within 12 minutes, and initiates the registration request to the LTE network.

Because the random access failure that causes the current registration failure conforms to the preset cause information, and the cumulative failure count is equal to the corresponding preset count 2, the condition for ending the registration early is met. Therefore, the terminal device may quickly escape to another network for registration.

From the related technical solutions, if failing to register for two consecutive times, the terminal device accumulates the failure count C=2, and enables the timer T3511 with a duration of 10 seconds, during which the terminal device waits in the SA network, and continues to attempt to register after timeout, consuming a long time in the registration. In the solution of this application, if failing to register for two consecutive times due to the random access failure, the terminal device may end the current round of SA network registration early, penalize the SA network for 12 minutes, disable the SA capability, and not initiate the registration on the SA network. At this time, the terminal device may fall back to the LTE network for registration to perform services to achieve quick escape.

In contrast, in the solution of this application, in a case that an anomaly occurs in the SA network registration process, if the cause of the second anomaly is a random access failure scenario, the SA network registration process may be ended early, and the terminal device falls back to the LTE network for registration, thereby reducing time that user service is affected, and improving user service experience.

After the terminal device registers with the LTE network, the penalty duration for the SA network ends, that is, after 12 minutes, the terminal device resumes the SA capability, and may return to the SA network for registration again, and perform steps S517 to S522. For description of S517 to S522, refer to the foregoing detailed description of S511 to S516, which is not repeated herein.

S511 to S516 may be considered as the first round of registration process, and S517 to S522 may be considered as the second round of registration process. Certainly, there may be more rounds of registration processes. Different from the first round of registration process, a penalty duration of the second round of registration process is increased to reduce time affected by registration anomaly. For details, refer to S422. If the random access failure causes the current registration failure and the cumulative failure count is equal to the corresponding preset count 2, the terminal device prohibits initiating the registration request to the SA network within 2 hours, and initiates the registration request to the LTE network. The penalty duration is increased from 12 minutes to 2 hours.

In the related art, if failing to register for the second time, the terminal device accumulates the failure count C=2, and enables the timer T3511 with a duration of 10 seconds, during which the terminal device waits in the SA network. Different from the related art, according to this application, the terminal device may end the current round of SA network registration early in the second round of registration process at this time, penalize the SA network for 2 hours, disable the SA capability, and not initiate the registration on the SA network. At this time, the terminal device may fall back to the LTE network for registration to perform services to achieve quick escape.

In the solution provided in the second embodiment, according to this application, the SA network registration process may be ended early if the cause of the second failure in the registration process is the random access failure, and it is not necessary to continue to accumulate the registration attempt count (corresponding to the cumulative failure count). In addition, the SA network is progressively penalized, and a penalty duration is 12 minutes in the first round. In the second round and each subsequent round, a penalty duration is 2 hours. Compared with a 12-minute prohibition after five unsuccessful registration attempts in the related art, the penalty duration is increased to 2 hours, thereby reducing the impact on user services by reducing time affected by registration anomaly. Therefore, in this application, the terminal device may quickly escape to the LTE network for registration if an anomaly occurs in the 5G SA network registration, thereby reducing time affected by registration anomaly and improving user service experience.

Third Embodiment: Scenario in which the Registration Fails Due to the Network Release Link In the third embodiment, an escape design is performed for the scenario in which the registration fails due to the network release link in the registration process (that is, if the 5G SA network registration is unsuccessful, the second network is registered with). Assuming that the preset cause information indicates that the registration fails due to the network release link, a corresponding preset count is 1; and assuming that a progressive penalty policy is: the SA network is penalized for 12 minutes (that is, the first preset penalty duration) in the first round, and penalized for 12 hours (that is, the second preset penalty duration) in the second and each subsequent round. Exemplarily, if the cause of the second registration failure is the network release link in the first round of registration process, the terminal device determines that the condition for ending the registration early is currently met, ends the SA network registration process, and penalizes the SA network, where the first penalty duration is 12 minutes. After the penalty expires (after 12 minutes), the terminal device may resume the SA capability and re-initiate the registration request to the SA network. In the second round of registration process, if the cause of the second registration failure is still the network release link, the terminal device ends the SA registration process early and penalizes the SA network for 12 hours.

Figure 10:
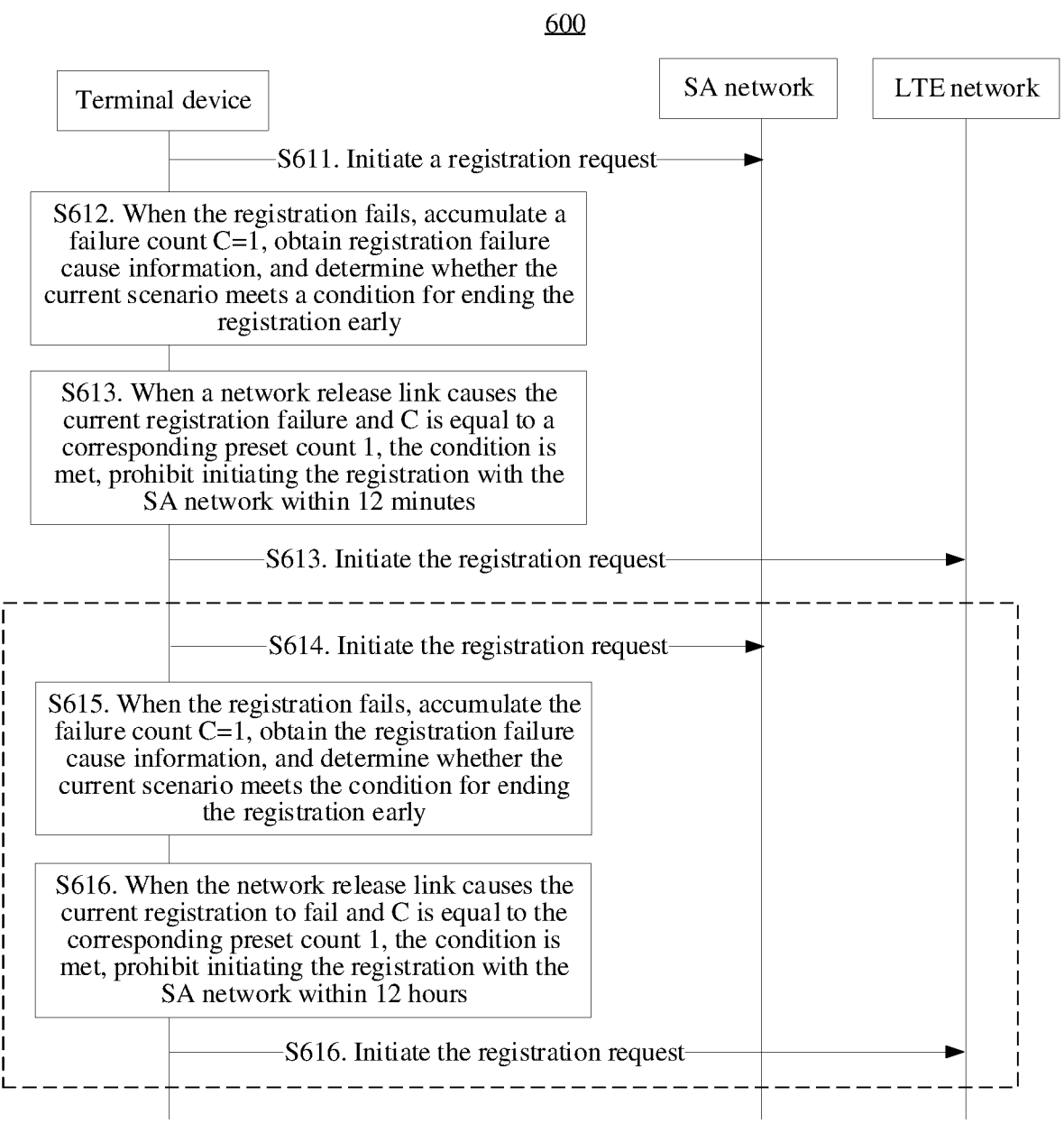
FIG. 10 is a schematic flowchart of a method for processing a network registration anomaly according to an embodiment of this application that is applied to a scenario in which a network release link causes a registration failure.

FIG. 10 is a schematic flowchart of the method for processing a network registration anomaly according to an embodiment of this application that is applied to a scenario in which the network release link causes the registration failure. As shown in FIG. 10, the method 600 may include the following steps S611 to S616.

S611. The terminal device initiates the registration request to the SA network.

Figure 11:
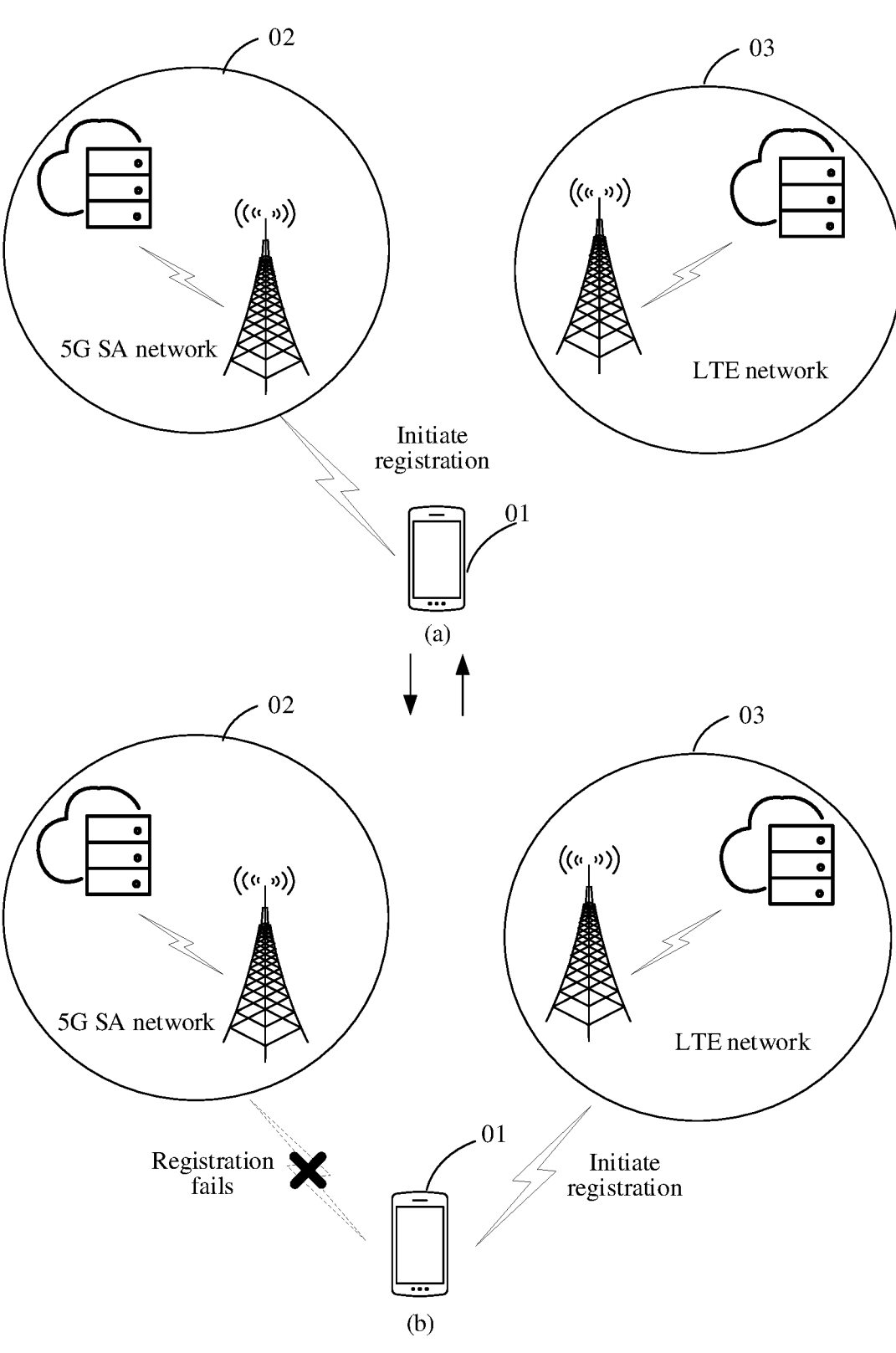
FIG. 11 is a schematic diagram of a method for processing a network registration anomaly according to an embodiment of this application that is applied to a communication system.

As shown in (a) of FIG. 11, if the terminal device 01 is powered on or is switched from an inter-system to the SA network 02, the terminal device initiates the registration request to the SA network 02 to access the SA network 02.

S612. If the registration fails, the terminal device accumulates the failure count C=1, obtains the registration failure cause information, and determines whether the current registration anomaly scenario meets the condition for ending the registration early.

The terminal device may determine whether the current registration anomaly scenario meets the condition for ending the registration early according to the registration failure cause information and the cumulative failure count. Exemplarily, if it is determined that the current registration fails due to the network release link and the cumulative failure count C is greater than or equal to the corresponding preset count 1, it may be determined that the current registration anomaly scenario meets the condition for ending the registration early. If it is determined that the current registration anomaly scenario meets the condition for ending the registration early, the terminal device continues to perform the following S613. If it is determined that the current registration anomaly scenario does not meet the condition for ending the registration early, the terminal device may enable a timer (for example, T3511), wait in the SA network, and continue to attempt to register after the timeout.

S613. If the network release link causes the current registration failure and the cumulative failure count is equal to the corresponding preset count 1, the condition for ending the registration early is met, the terminal device prohibits initiating the registration request to the SA network within 12 minutes, and initiates the registration request to the LTE network.

Because the network release link that causes the current registration failure conforms to the preset cause information, and the cumulative failure count is equal to the corresponding preset count 1, the condition for ending the registration early is met. Therefore, as shown in (b) of FIG. 11, the terminal device 01 may quickly escape to the LTE network 03 for registration.

From the related technical solutions, if failing to register for the first time, the terminal device accumulates the failure count C=1, and enables the timer T3511 with a duration of 10 seconds, during which the terminal device waits in the SA network, and continues to attempt to register, consuming a long time in the registration. In the solution of this application, if failing to register for the first time due to the network release link, the terminal device may end the current round of SA network registration early, penalize the SA for 12 minutes, disable the SA capability, and not initiate the registration on the SA network. At this time, the terminal device may fall back to the LTE network for registration to perform services to achieve quick escape. In contrast, in the solution of this application, in a case that an anomaly occurs in the SA network registration process, if the cause of the second anomaly is a network release link scenario, the SA network registration process may be ended early, and the terminal device falls back to the LTE network for registration, thereby reducing time that user service is affected, and improving user service experience.

After the terminal device registers with the LTE network, the penalty duration for the SA network ends, that is, after 12 minutes, the terminal device resumes the SA capability, and may return to the SA network for registration again, and perform steps S614 to S616. For description of S614 to S616, refer to the foregoing detailed description of S611 to S613, which is not repeated herein.

S611 to S613 may be considered as the first round of registration process, and S614 to S616 may be considered as the second round of registration process. Certainly, there may be more rounds of registration processes. Different from the first round of registration process, a penalty duration of the second round of registration process is increased to reduce time affected by registration anomaly. For details, refer to S616. If the network release link causes the current registration failure and the cumulative failure count is equal to the corresponding preset count 1, the terminal device prohibits initiating the registration request to the SA network within 12 hours, and initiates the registration request to the LTE network. The penalty duration is increased from 12 minutes to 12 hours.

In the related art, if failing to register for the first time, the terminal device accumulates the failure count C=1, and enables the timer T3511 with a duration of 10 seconds, during which the terminal device waits in the SA network. Different from the related art, according to this application, the terminal device may end the current round of SA network registration early in the second round of registration process at this time, penalize the SA network for 12 hours, disable the SA capability, and not initiate the registration on the SA network. At this time, the terminal device may fall back to the LTE network for registration to perform services to achieve quick escape.

In the solution provided in the third embodiment, in this application, the SA network registration process may be ended early if the cause of the first failure in the registration process is the network release link, and it is not necessary to continue to accumulate the registration attempt count (corresponding to the cumulative failure count). In addition, the SA network is progressively penalized, and a penalty duration is 12 minutes in the first round. In the second round and each subsequent round, a penalty duration is 12 hours. Compared with a 12-minute prohibition after five unsuccessful registration attempts in the related art, the penalty duration is increased to 12 hours, thereby reducing the impact on user services by reducing time affected by registration anomaly. Therefore, in this application, the terminal device may quickly escape to the LTE network for registration if an anomaly occurs in the 5G SA network registration, thereby reducing time affected by registration anomaly and improving user service experience.

It should be noted that, although only 13 anomaly causes are currently listed in the embodiments of this application, and three embodiments are given, the registration anomaly cause may be understood as a variable input parameter of the solution, and other causes may also be implemented using an implementation logic of the solution of this application. Therefore, the currently listed anomaly causes may continue to be expanded. In addition, configuration parameters in the embodiments may be flexibly modified and customized according to network situations.

According to the method for processing a network registration anomaly provided in the embodiments of this application, the terminal device can quickly escape if an anomaly occurs in the 5G SA network registration process, and if the condition for ending the registration early is met, the terminal device can end the SA network registration process, and quickly escape to the LTE network for registration, thereby reducing time affected by registration anomaly and improving user service experience.

It should be noted that, first, according to the solution of this application, a maximum registration attempt count (5 stipulated in the protocol) may be customized according to different anomaly cause values (that is, the registration failure cause information), so that the SA network registration can be ended early if an anomaly occurs. Specific design of the maximum registration attempt count for different anomaly cause values may be customized in various possible implementations. This is not limited in this application. Second, according to the solution in this application, the penalty duration may be customized, and a progressive penalty policy may be designed. For example, the penalty duration of the second round of registration process is longer than that of the first round of registration process. There may be various possible implementations for how to design the progressive penalty policy. This is not limited in this application. Third, according to the solution of this application, the timer may be enabled without a fixed duration according to the anomaly cause values. There may be various possible implementations for how to design the timer duration corresponding to the anomaly cause values. This is not limited in this application.

It should also be noted that, in the embodiments of this application, "greater than" may be replaced with "greater than or equal to", "less than or equal to" may be replaced with "less than", or "greater than or equal to" may be replaced with "greater than", and "less than" may be replaced with "less than or equal to".

Each embodiment described herein may be an independent solution, or may be combined according to an internal logic, and these solutions all fall within the protection scope of this application.

It may be understood that, the methods and operations implemented by the access network device in the foregoing method embodiments may also be implemented by a component (for example, a chip or a circuit) that may be used in the access network device. The methods and operations implemented by the terminal device in the foregoing method embodiments may also be implemented by a component (for example, a chip or a circuit) that may be used in the terminal device. It may be understood that, the methods and operations implemented by the core network device in the foregoing method embodiments may also be implemented by a component (for example, a chip or a circuit) that may be used in the core network device.

The foregoing describes the method embodiments provided in this application, and the following describes the apparatus embodiments provided in this application. It should be understood that the description of the apparatus embodiments corresponds to the description of the method embodiments. Therefore, for content not described in detail, reference may be made to the foregoing method embodiments. This is not repeated herein for brevity.

The solutions provided in the embodiments of this application are described above mainly from a perspective of interaction between device and device. It may be understood that, to implement the foregoing functions, each device, such as a transmitter device or a receiver device, includes corresponding hardware structures and/or software modules for executing various functions. A person skilled in the art may aware that, in combination with the units and algorithm steps of the examples described in the embodiments disclosed in this specification, this application can be implemented by hardware or a combination of hardware and computer software. Whether a function is implemented by hardware or computer software driving hardware depends on particular applications and design constraints of the technical solutions. Those skilled in the art may use different methods to implement the described functions for each particular application, but such implementation is not to be considered beyond the protection scope of this application.

In the embodiments of this application, functional modules of the transmitter device or the receiver device may be divided based on the foregoing method examples. For example, functional modules may be divided corresponding to functions, or two or more functions may be integrated into one processing module. The integrated module may be implemented in the form of hardware, or may be implemented in the form of a software functional module. It should be noted that, In the embodiments of this application, the module division is an example, and is merely logical function division, and there may be other possible division manners during actual implementation. The following descriptions are made by using an example in which functional modules are divided corresponding to functions.

Figure 12:
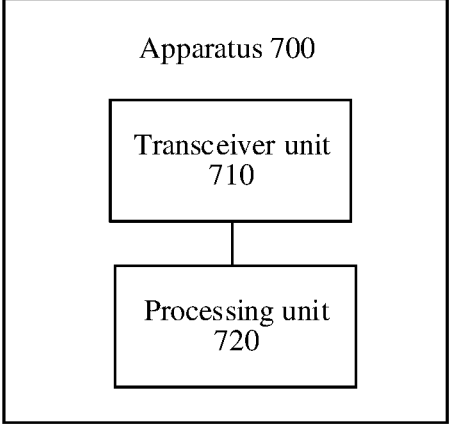
FIG. 12 is a schematic block diagram of an apparatus for processing a registration anomaly according to an embodiment of this application.

FIG. 12 is a schematic block diagram of an apparatus 700 for processing a network registration anomaly according to an embodiment of this application. The apparatus 700 may be configured to perform an action performed by the access network device in the foregoing method embodiments. The apparatus 700 includes a transceiver unit 710 and a processing unit 720. The transceiver unit 710 is configured to perform transceiving-related operations on the terminal device side in the foregoing method embodiments. The transceiver unit 710 may further be referred to as a communication interface or a communication unit. The processing unit 720 is configured to perform data processing, and to perform processing-related operations on the terminal device side in the foregoing method embodiments.

The transceiver unit 710 is configured to initiate an $M^{th}$ registration request to a 5G SA network, where M is a positive integer less than N, and N is a preset integer.

The processing unit 720 is configured to, in a case that the $M^{th}$ registration fails, obtain cause information of the $M^{th}$ registration failure and a cumulative failure count M; and if the cause information of the $M^{th}$ registration failure conforms to first preset cause information, and the cumulative failure count M is greater than or equal to a first preset count corresponding to the first preset cause information, execute a first processing policy corresponding to the first preset cause information, where the first processing policy includes stopping initiating the registration request to the 5G SA network, and initiating the registration request to a second network different from the 5G SA network.

In some embodiments, N may be 5. Exemplarily, M may be 1, 2, 3, or 4. If M is 1, the transceiver unit 710 initiates the first (that is, initial) registration request to the 5G SA network. If M is greater than 1 and less than 5, before the transceiver unit 710 initiates the $M^{th}$ registration request to the 5G SA network, the apparatus 700 fails to register with the 5G SA network for M−1 consecutive times. For example, if M is 2, the apparatus 700 initiates the second registration request to the 5G SA network after the first registration with the 5G SA network fails.

In some embodiments, the second network may be an LTE network. Exemplarily, in a case that a mobile phone fails to register with the 5G SA network for consecutive times, if it is determined that a current registration anomaly scenario meets a condition for ending the registration early according to the registration failure cause information and the cumulative failure count, the mobile phone stops initiating the registration request to the 5G SA network, and may initiate the registration request to the LTE network at this time. Therefore, according to the apparatus for processing a network registration anomaly provided in this application, the mobile phone can quickly escape if an anomaly occurs in the 5G SA network registration process, and fall back to the LTE network for registration, thereby reducing time affected by registration anomaly and improving user service experience.

In some embodiments, if M is greater than 1 and less than N, before the transceiver unit 710 initiates the $M^{th}$ registration request to the 5G SA network, the apparatus 700 fails to register with the 5G SA network for M−1 consecutive times.

In some embodiments, the apparatus 700 may further include a counting unit. The counting unit is configured to count once each time the apparatus 700 fails to register with the 5G SA network, and accumulate the cumulative failure count M in a case that the registration fails for the $M^{th}$ time.

In some embodiments, the first preset cause information may be used to indicate any one of the following: a registration failure due to a link establishment failure, a registration failure due to a link released after being established, a registration failure due to no response from the 5G SA network, and a registration failure due to registration reject from the 5G SA network.

In some embodiments, the transceiver unit 710 is further configured to initiate an $(M+1)^{th}$ registration request to the 5G SA network after a first waiting duration, if the cause information of the $M^{th}$ registration failure does not conform to the first preset cause information, or if the cause information of the $M^{th}$ registration failure conforms to the first preset cause information and the cumulative failure count M is less than the first preset count.

In some embodiments, the processing unit 720 is further configured to, in a case that the apparatus 700 fails to register with the 5G SA network for the $(M+1)^{th}$ time, obtain cause information of the $(M+1)^{th}$ registration failure and a cumulative failure count M+1; and if the cause information of the $(M+1)^{th}$ registration failure conforms to second preset cause information, and the cumulative failure count M+1 is greater than or equal to a second preset count corresponding to the second preset cause information, execute the first processing policy corresponding to the second preset cause information.

In some embodiments, the processing unit 720 is specifically configured to prohibit initiating the registration request to the 5G SA network within a first preset penalty duration corresponding to the first preset cause information. The first preset penalty duration is greater than the first waiting duration.

In some embodiments, the transceiver unit 710 is further configured to initiate the registration request to the 5G SA network after the first preset penalty duration.

In some embodiments, the transceiver unit 710 is specifically configured to receive instruction information sent by the 5G SA network or the second network, and initiate the registration request to the 5G SA network according to the instruction information. The instruction information is used to instruct to initiate the registration request to the 5G SA network.

In some embodiments, the processing unit 720 is further configured to prohibit initiating the registration request to the 5G SA network within a second preset penalty duration in a case that the transceiver unit 710 fails to register with the 5G SA network for M consecutive times and registration failure cause information of the $M^{th}$ registration failure conforms to the first preset cause information. The second preset penalty duration may be greater than the first preset penalty duration.

In some embodiments, the apparatus 700 may further include a storage unit. The storage unit is configured to pre-store at least one correspondence, where the at least one correspondence includes a first correspondence and a second correspondence, the first correspondence is a correspondence among the first preset cause information, the first preset count, and the first processing policy, and the second correspondence is a correspondence among the second preset cause information, the second preset count, and the first processing policy.

In some embodiments, the processing unit 720 is further configured to determine the first preset count corresponding to the first preset cause information according to the first correspondence if the cause information of the $M^{th}$ registration failure conforms to the first preset cause information.

In some embodiments, the transceiver unit 710 is specifically configured to initiate the registration request to the second network in a case that the apparatus 700 searches for at least one available network other than the 5G SA network, where the at least one available network includes the second network, and reference signal received quality of the second network in the at least one available network is optimal.

According to the apparatus for processing a registration anomaly provided in this embodiment of this application, if an anomaly occurs in a network registration, a terminal device may obtain registration failure cause information and a cumulative failure count, to determine whether a condition for ending the registration early is met. If the condition is met, a registration process is ended early, there is no need to re-attempt for a plurality of times according to a protocol, and another network can be registered with to quickly resume services at this time. Therefore, according to the solution of this application, an abnormal registration can be ended early and another network is registered with if an anomaly occurs in a network registration, to reduce time affected by registration anomaly, thereby solving a problem of frequent registration failures due to a network anomaly or a poor environmental signal in the network registration process, and improving user service experience.

The apparatus 700 according to the embodiments of this application may correspond to the methods described in the embodiments of this application, and the foregoing and other operations and/or functions of the units in the apparatus 700 are respectively for implementing corresponding procedures in the methods. For brevity, details are not described herein again.

Figure 13:
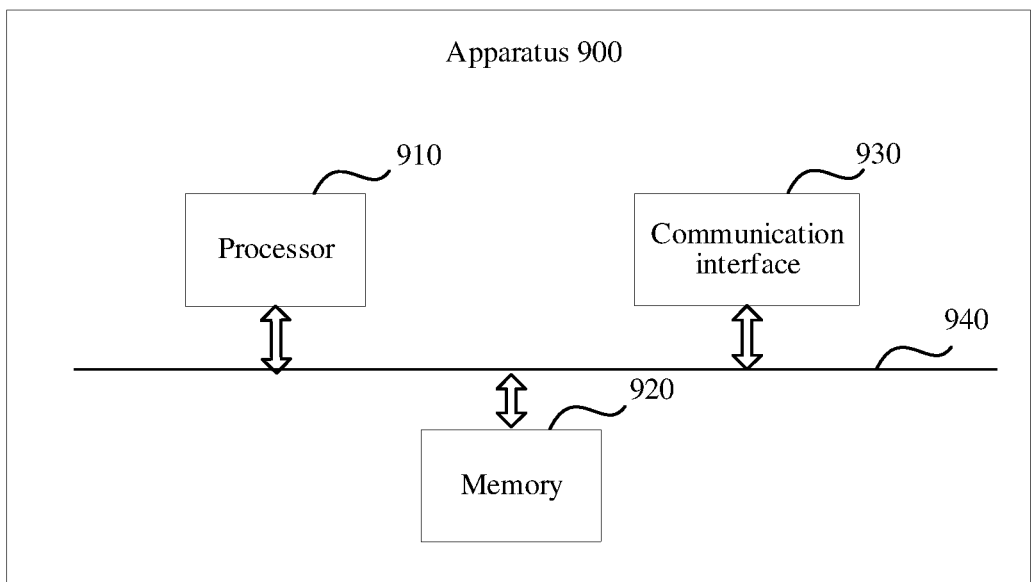
FIG. 13 is a schematic block diagram of a communication apparatus according to an embodiment of this application.

FIG. 13 is a schematic structural diagram of a communication apparatus 900 according to an embodiment of this application. The communication apparatus 900 includes: a processor 910, a memory 920, a communication interface 930, and a bus 940.

In a possible implementation, the processor 910 in the apparatus 900 shown in FIG. 13 may correspond to the processing unit 720 in the apparatus 700 in FIG. 12. The communication interface 930 in the apparatus 900 shown in FIG. 13 may correspond to the transceiver unit 710 in the apparatus 700 in FIG. 12.

The processor 910 may be connected to the memory 920. The memory 920 may be configured to store program code and data. Therefore, the memory 920 may be a storage unit inside the processor 910, or may be an external storage unit independent of the processor 910, or may further be a component including the storage unit inside the processor 910 and the external storage unit independent of the processor 910.

Optionally, the apparatus 900 may further include a bus 940. The memory 920 and the communication interface 930 may be connected to the processor 910 by the bus 940. The bus 940 may be a peripheral component interconnect (peripheral component interconnect, PCI) bus, an extended industry standard architecture (extended industry standard architecture, EISA) bus, or the like. The bus 940 may be classified into an address bus, a data bus, a control bus, or the like. For ease of description, in FIG. 13, only one line is used for description, which does not indicate that there is only one bus or only one type of bus.

It should be understood that, in the embodiments of this application, the processor 910 may adopt a central processing unit (central processing unit, CPU). The processor may be another general purpose processor, a digital signal processor (digital signal processor, DSP), an application-specific integrated circuit (application specific integrated circuit, ASIC), a field programmable gate array (field programmable gate array, FPGA) or another programmable logical device, a discrete gate or transistor logic device, a discrete hardware component, or the like. The general-purpose processor may be a microprocessor, or the processor may be any conventional processor and the like. Alternatively, the processor 810 adopts one or more integrated circuits to execute related programs, so as to implement the technical solutions provided in the embodiments of this application.

The memory 920 may include a read-only memory (ROM) and a random access memory (RAM), and provide instructions and data to the processor 910. A part of the processor 910 may further include a non-volatile random access memory. For example, the processor 910 may further store information about a device type.

If the apparatus 900 is running, the processor 910 executes computer-executable instructions in the memory 920 to perform the operation steps of the foregoing methods by using the apparatus 700.

It should be understood that the apparatus 900 according to the embodiments of this application may correspond to the apparatus 700 in the embodiments of this application, and the foregoing and other operations and/or functions of the units in the apparatus 700 are respectively for implementing corresponding procedures in the methods. For brevity, details are not described herein again.

Optionally, in some embodiments, the embodiments of this application further provide a computer-readable medium, storing program code, the computer program code, if run on a computer, causing the computer to perform the method according to the foregoing aspects.

Optionally, in some embodiments, the embodiments of this application further provide a computer program product. The computer program product includes computer program code, the computer program code, if run on a computer, causing the computer to perform the methods according to the foregoing aspects.

In the embodiments of this application, the terminal device or the network device includes a hardware layer, an operating system layer running in the hardware layer, and an application layer running on the operating system layer. The hardware layer may include hardware such as a central processing unit (central processing unit, CPU), a memory management unit (memory management unit, MMU), and a memory (which is also referred to as a main memory). The operating system in the operating system layer may be any one or more computer operating systems such as a Linux operating system, a Unix operating system, an Android operating system, an iOS operating system, or a Windows operating system that implement service processing by using a process (process). The application layer may include an application such as a browser, an address book, word processing software, or instant messaging software.

The embodiments of this application do not specifically limit a specific structure of an execution entity of the methods provided in the embodiments of this application, as long as the program in which the code of the methods provided in the embodiments of this application is recorded can be executed for communication according to the embodiments of the present application. For example, the execution entity of the methods provided in the embodiments of this application may be the terminal device or the network device, or a functional module in the terminal device or the network device that can call a program and execute the program.

Aspects or features of this application may be implemented as a method, an apparatus or a product that uses standard programming and/or engineering technologies. The term "product" used in this application may cover a computer program that can be accessed from any computer readable component, carrier or medium. For example, the computer-readable medium may include but is not limited to: a magnetic storage component (such as a hard disk, a floppy disk, or a magnetic tape), an optical disc (for example, a compact disc (compact disc, CD), or a digital versatile disc (digital versatile disc, DVD)), a smart card, and a flash memory component (such as an erasable programmable read-only memory (erasable programmable read-only memory, EPROM), a card, a stick, or a key drive).

Various storage media described in this specification may indicate one or more devices and/or other machine-readable media that is used to store information. The term "machine readable media" may include but is not limited to a radio channel, and various other media that can store, contain and/or carry an instruction and/or data.

It should be understood that, the processor described in the embodiments of this application may be a central processing unit (central processing unit, CPU), or may be another general-purpose processor, a digital signal processor (digital signal processor, DSP), an application-specific integrated circuit (application specific integrated circuit, ASIC), a field-programmable gate array (field-programmable gate array, FPGA), or another programmable logic device, a discrete gate or a transistor logic device, a discrete hardware component, or the like. The general-purpose processor may be a microprocessor, or the processor may be any conventional processor and the like.

It may further be understood that the memory described in the embodiments of this application may be a volatile memory or a non-volatile memory, or may include a volatile memory and a non-volatile memory. The non-volatile memory may be a read-only memory (read-only memory, ROM), a programmable ROM (programmable ROM, PROM), an erasable PROM (erasable PROM, EPROM), an electrically EPROM (electrically EPROM, EEPROM), or a flash memory. The volatile memory may be a random access memory (random access memory, RAM). For example, the RAM may be used as an external cache. As an example but not a limit, RAM may include the following various forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that, if the processor is a general-purpose processor, a DSP, an ASIC, an FPGA, or another programmable logic device, a discrete gate or a transistor logic device, or a discrete hardware component, the memory (a storage module) may be integrated into the processor.

It should be further noted that the memory described herein aims to include but not limited to these memories and any other suitable types of memories.

A person of ordinary skill in the art may be aware that the units and steps in the examples described with reference to the embodiments disclosed in this specification may be implemented by electronic hardware or a combination of computer software and electronic hardware. Whether the functions are executed in a mode of hardware or software depends on particular applications and design constraint conditions of the technical solutions. Those skilled in the art may use different methods to implement the described functions for each particular application, but such implementation is not to be considered beyond the protection scope of this application.

Persons skilled in the art can clearly understand that for convenience and conciseness of description, for specific working processes of the foregoing described system, apparatus and unit, reference may be made to the corresponding processes in the foregoing method embodiments, and details are not described herein.

In the embodiments provided in this application, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application can be integrated into one unit, or each of the units can exist alone physically, or two or more units are integrated into one unit.

If implemented in the form of software functional units and sold or used as an independent product, the functions may also be stored in a computer-readable storage medium. Based on such an understanding, the technical solutions of this application essentially, or the part contributing to the related art, or some of the technical solutions may be implemented in a form of a computer software product. The computer software product is stored in a storage medium, and includes several instructions for instructing a computer device (which may be a personal computer, a server, a network device, or the like) to perform all or some of the steps of the methods described in the embodiments of this application. The foregoing storage medium may include but is not limited to: any medium that can store program code, such as a USB flash drive, a removable hard disk, a ROM (read-only memory, ROM), a RAM (random access memory, RAM), a magnetic disk, or an optical disc.

Unless otherwise defined, meanings of all technical and scientific terms used in this specification are the same as those usually understood by a person skilled in the art to which this application belongs. In this application, terms used in the specification of this application are merely intended to describe objectives of the specific embodiments, but are not intended to limit this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimd is:

1. A method for processing a network registration anomaly, comprising:

initiating, by a terminal device, an $M^{th}$ registration request to a fifth generation standalone (5G SA) network, wherein M is a positive integer less than 5 indicating less than 5 registration requests have been previously initiated;

in a case that the $M^{th}$ registration request fails, obtaining, by the terminal device, cause information of the $M^{th}$ registration failure and a cumulative failure count M; and if the cause information of the $M^{th}$ registration failure conforms to a first preset cause information, and the cumulative failure count M is greater than or equal to a first preset failure count corresponding to the first preset cause information, executing, by the terminal device, a first processing policy corresponding to the first preset cause information, wherein executing the first processing policy comprises: stopping initiating a next registration request to the 5G SA network, and initiating the next registration request to a second network different from the 5G SA network, wherein the first preset cause information is used to indicate any one of the following: a registration failure due to a link establishment failure, a registration failure due to a link released after being established, a registration failure due to no response from the 5G SA network, or a registration failure due to registration reject from the 5G SA network.

2. The method according to claim 1, wherein after the obtaining, by the terminal device, cause information of the $M^{th}$ registration failure and a cumulative failure count M, the method further comprises:

initiating, by the terminal device, an $(M+1)^{th}$ registration request to the 5G SA network after a first waiting duration, if the cause information of the $M^{th}$ registration failure does not conform to the first preset cause information, or if the cause information of the $M^{th}$ registration failure conforms to the first preset cause information and the cumulative failure count M is less than a first preset count.

3. The method according to claim 2, wherein after the initiating, by the terminal device, an $(M+1)^{th}$ registration request to the 5G SA network after a first waiting duration, the method further comprises:

in a case that the terminal device fails to register with the 5G SA network for the $(M+1)^{th}$ time, obtaining, by the terminal device, cause information of the $(M+1)^{th}$ registration failure and a cumulative failure count M+1; and if the cause information of the $(M+1)^{th}$ registration failure conforms to second preset cause information, and the cumulative failure count M+1 is greater than or equal to a second preset count corresponding to the second preset cause information, executing, by the terminal device, the first processing policy, wherein the first processing policy corresponds to the second preset cause information.

4. The method according to claim 2, wherein the method further comprises:

enabling, by the terminal device, a timer T3511 if the cause information of the $M^{th}$ registration failure does not conform to the first preset cause information, or if the cause information of the $M^{th}$ registration failure conforms to the first preset cause information and the cumulative failure count M is less than the first preset count, wherein a preset duration of the timer T3511 is equal to the first waiting duration.

5. The method according to claim 2, wherein the first waiting duration is 10 seconds.

6. The method according to claim 1, wherein the stopping, by terminal device, initiating the next registration request to the 5G SA network comprises:

prohibiting, by the terminal device, initiating the next registration request to the 5G SA network within a first preset penalty duration corresponding to the first preset cause information.

7. The method according to claim 6, wherein, the first preset penalty duration is greater than the first waiting duration.

8. The method according to claim 6, wherein after the prohibiting, by the terminal device, initiating the next registration request to the 5G SA network within a first preset penalty duration, the method further comprises:

initiating, by the terminal device, the next registration request to the 5G SA network after the first preset penalty duration.

9. The method according to claim 8, wherein before the initiating, by the terminal device, the next registration request to the 5G SA network after the first preset penalty duration, the method further comprises:

receiving, by the terminal device, instruction information sent by the 5G SA network or the second network, wherein the instruction information is used to instruct to initiate the next registration request to the 5G SA network; and the initiating, by the terminal device, the next registration request to the 5G SA network comprises:

initiating, by the terminal device, the next registration request to the 5G SA network according to the instruction information.

10. The method according to claim 8, wherein after the initiating, by the terminal device, the next registration request to the 5G SA network, the method further comprises:

prohibiting, by the terminal device, initiating the next registration request to the 5G SA network within a second preset penalty duration in a case that the terminal device fails to register with the 5G SA network for M consecutive times and registration failure cause information of the $M^{th}$ registration failure conforms to the first preset cause information, wherein the second preset penalty duration is greater than the first preset penalty duration.

11. The method according to claim 1, wherein the method further comprises:

pre-storing, by the terminal device, at least one correspondence, wherein the at least one correspondence comprises a first correspondence and a second correspondence, the first correspondence is a correspondence among the first preset cause information, a first preset count, and the first processing policy, and the second correspondence is a correspondence among second preset cause information, a second preset count, and the first processing policy; and if the cause information of the $M^{th}$ registration failure conforms to the first preset cause information, the method further comprises:

determining, by the terminal device, the first preset count corresponding to the first preset cause information according to the first correspondence.

12. The method according to claim 1, wherein the initiating, by the terminal device, the next registration request to a second network different from the 5G SA network comprises:

searching for, by the terminal device, at least one available network other than the 5G SA network, wherein the at least one available network comprises the second network, and reference signal received quality of the second network in the at least one available network is optimal; and initiating, by the terminal device, the next registration request to the second network.

13. The method according to claim 1, wherein if M is greater than 1 and less than N, before the terminal device initiates the Mth registration request to the 5G SA network, the terminal device fails to register with the 5G SA network for M−1 consecutive times.

14. The method according to claim 1, further comprising:

counting, by the terminal device, once each time the terminal device fails to register with the 5G SA network, and accumulating the cumulative failure count M in a case that the $M^{th}$ registration fails.

15. The method according to claim 1, wherein the second network is a long term evolution (LTE) network.

16. An apparatus for processing a registration anomaly, comprising: a memory, a processor, and a program stored in the memory and executable on the processor, wherein the processor, when executing the program, causes the apparatus to perform operations comprising:

initiating an $M^{th}$ registration request to a fifth generation standalone (5G SA) network, wherein M is a positive integer less than 5 indicating less than 5 registration requests have been previously initiated;

in a case that the $M^{th}$ registration request fails, obtaining cause information of the $M^{th}$ registration failure and a cumulative failure count M; and if the cause information of the $M^{th}$ registration failure conforms to a first preset cause information, and the cumulative failure count M is greater than or equal to a first preset failure count corresponding to the first preset cause information, executing a first processing policy corresponding to the first preset cause information, wherein the first processing policy comprises: stopping initiating a next registration request to the 5G SA network, and initiating the next registration request to a second network different from the 5G SA network, wherein the first preset cause information is used to indicate any one of the following: a registration failure due to a link establishment failure, a registration failure due to a link released after being established, a registration failure due to no response from the 5G SA network, or a registration failure due to registration reject from the 5G SA network.

17. The apparatus according to claim 16, further comprising a transceiver.

18. A non-transitory computer-readable storage medium, wherein the non-transitory computer-readable storage medium stores a computer program, and the computer program, when executed, implements operations comprising initiating an $M^{th}$ registration request to a fifth generation standalone (5G SA) network, wherein M is a positive integer less than 5 indicating less than 5 registration requests have been previously initiated;

in a case that the $M^{th}$ registration request fails, obtaining cause information of the $M^{th}$ registration failure and a cumulative failure count M; and if the cause information of the $M^{th}$ registration failure conforms to a first preset cause information, and the cumulative failure count M is greater than or equal to a first preset failure count corresponding to the first preset cause information, executing a first processing policy corresponding to the first preset cause information, wherein the first processing policy comprises: stopping initiating a next registration request to the 5G SA network, and initiating the next registration request to a second network different from the 5G SA network, wherein the first preset cause information is used to indicate any one of the following: a registration failure due to a link establishment failure, a registration failure due to a link released after being established, a registration failure due to no response from the 5G SA network, or a registration failure due to registration reject from the 5G SA network.

19. The apparatus for processing the registration anomaly according to claim 16, wherein the processor, when executing the program, causes the apparatus to perform operations comprising:

after obtaining the cause information of the $M^{th}$ registration failure and the cumulative failure count M, initiating an $(M+1)^{th}$ registration request to the 5G SA network after a first waiting duration, if the cause information of the $M^{th}$ registration failure does not conform to the first preset cause information, or if the cause information of the $M^{th}$ registration failure conforms to the first preset cause information and the cumulative failure count M is less than a first preset count.

20. The non-transitory computer-readable storage medium according to claim 18, wherein the computer program, when executed, implements operations comprising:

after obtaining the cause information of the Mth registration failure and the cumulative failure count M, initiating an $(M+1)^{th}$ registration request to the 5G SA network after a first waiting duration, if the cause information of the $M^{th}$ registration failure does not conform to the first preset cause information, or if the cause information of the $M^{th}$ registration failure conforms to the first preset cause information and the cumulative failure count M is less than a first preset count.

* * * * *